United States Patent Office 3,340,213
Patented Sept. 5, 1967

3,340,213
COATING COMPOSITIONS FROM MONOEPOXY ALCOHOLS
Charles W. McGary, Jr., Charleston, and Charles T. Patrick, Jr., South Charleston, W. Va., assignors to Union Carbide Corporation, a corporation of New York
No Drawing. Filed May 19, 1964, Ser. No. 368,726
24 Claims. (Cl. 260—22)

This invention relates to novel coating compositions. In one aspect, this invention relates to novel coating compositions prepared from monoepoxy alcohol compounds. In another aspect the invention relates to novel drying and non-drying coating compositions which result from the reaction of monoepoxy alcohol compounds, a fatty acid or oil, and one or more polyfunctional acids or anhydrides.

One of the largest outlets for alkyd resins is in the coatings field such as architectural finishes, for example, flat wall paints, enamels, exterior trim paints, and the like, and in metal coatings such as appliance and automotive topcoats and finishes. However, in spite of the fact that alkyd resins are employed in a sizeable portion of the coatings market, they possess several deficiencies which tend to exclude them from certain fields where inexpensive coatings are in demand. For example, the alkyd resins have a relatively poor chemical resistance, which renders them unsuitable for many applications. In many instances the alkyd resins have been supplanted by the more expensive coatings, such as epoxy esters, urethanes, and the like, which do not possess these deficiencies. Although the known epoxy ester coatings for the most part possess chemical resistance superior to the alkyl resins, in many instances they are economically unattractive for large scale use or suffer from other deficiencies which the inexpensive alkyl resins do not possess.

In contrast, the novel compounds which are obtained in accordance with the teachings of the instant invention have extraordinary and outstanding utility as drying and non-drying coating compositions and are superior in many respects to the alkyd resins. These coating compositions are prepared by the reaction of a monoepoxy alcohol compound, or a mixture of monoepoxy alcohol compounds, a fatty acid or oil, and a polyfunctional acid or anhydride, in the presence of various catalysts, as will be explained hereinafter. The reaction of the aforementioned components yields novel coating compositions which have excellent solubility in various inexpensive solvents, and which have a myriad of useful and unexpected characteristics. It has been observed that the novel coating compositions when cured exhibit, for example, excellent water, caustic and chemical resistance; excellent adhesion, toughness, and flexibility; excellent color stability and outstanding retention of gloss upon exposure to light and weathering; and/or extraordinary hardness as indicated by Sward values of upward to about 60, and greater, as compared to values of less than 40 for films prepared from commercial drying oil compositions.

Accordingly, one or more of the following objects will be achieved by the practice of the instant invention. It is an object of this invention to provide novel coating compositions which are superior in many respects to the conventional alkyl resins. Another object of this invention is to provide novel coating compositions prepared from monoepoxy alcohol compounds which exhibit superior water and alkali-resistance. A further object is to provide novel coating compositions which result from the reaction of monoepoxy alcohol compounds, a fatty acid or oil, and one or more polyfunctional acids or anhydrides. Another object of this invention is to provide a process for the preparation of the novel coating compositions of this invention. These and other objects will readily become apparent to those skilled in the art in the light of the teachings herein set forth.

As hereinbefore indicated, the present invention relates to novel coating compositions which result from the reaction of: (1) monoepoxy alcohol compounds, (2) a fatty acid or oil, and (3) one or more polyfunctional acids or anhydrides. Coatings prepared by the process of the invention and containing the ingredients set forth below are characterized by exceptional resistance to chemicals and other desirable properties in addition to being economically comparable to the known alkyd resins currently in use.

The first component employed in the preparation of the novel coating compositions of this invention is a monoepoxy alcohol compound. The monoepoxy alcohol compounds include among others, (a) 4-oxatetracyclo[6.2.1.0$^{2,7}$.0$^{3,5}$]undecan-9-ol,
(b) 4-oxatetracyclo[6.2.1.0$^{2,7}$.0$^{3,5}$]undec-9-oxyalkanol,
(c) 4-oxatetracyclo[6.2.1.0$^{2,7}$.0$^{3,5}$]undec-9-oxyalkane-poly-ol,
(d) 4-oxatetracyclo[6.2.1.0$^{2,7}$.0$^{3,5}$]undecane-9,10-diol,
(e) 4-oxatetracyclo[6.2.1.0$^{2,7}$.0$^{3,5}$]undecane-10,11-diol,
(f) 10-oxapentacyclo[6.3.1.1$^{3,6}$.0$^{2,7}$.0$^{9,11}$]tridecan-4-ol,
(g) 10-oxapentacyclo[6.3.1.1$^{3,6}$.0$^{2,7}$.0$^{9,11}$] tridecane-4,5-diol,
(h) 10-oxapentacyclo[6.3.1.1$^{3,6}$.0$^{2,7}$.0$^{9,11}$]tridec-4-ylalkanol,
(i) 10-oxapentacyclo[6.3.1.1$^{3,6}$.0$^{2,7}$.0$^{9,11}$]tridec-4,5-ylenedialkanol,
(j) 10-oxapentacyclo[6.3.1.1$^{3,6}$.0$^{2,7}$.0$^{9,11}$]tridec-4-oxyalkanol,
(k) 10-oxapentacyclo[6.3.1.1$^{3,6}$.0$^{2,7}$.0$^{9,11}$]tridec-4-oxyalkanepoly-ol,
(l) 10-oxapentacyclo[6.3.1.1$^{3,6}$.0$^{2,7}$.0$^{9,11}$]tridec-4-ylmethyleneoxyalkanol,
(m) 10-oxapentacyclo[6.3.1.1$^{3,6}$.0$^{2,7}$.0$^{9,11}$]tridec-4-yl methyleneoxyalkane-poly-ol,
(n) the 4-oxatetracyclo[6.2.1.0$^{2,7}$.0$^{3,5}$]undec-9-oxy(mono- and polyalkyleneoxy)alkanols, which result from the mono-epoxidation of the reaction products of tricyclo[5.2.1.0$^{2,6}$]dec-3-en-8-ol with a saturated aliphatic mono vicinal-epoxyhydrocarbon.
(o) the 4-oxatetracyclo[6.2.1.0$^{2,7}$.0$^{3,5}$]undec-9,10-ylene-di[oxy(mono- and polyalkyleneoxy)alkanols] which result from the monoepoxidation of the reaction products of tricyclo[5.2.1.0$^{2,6}$]dec-3-ene-8,9-diol with a saturated aliphatic mono vicinal-epoxyhydrocarbon,
(p) the 4-oxatetracyclo[6.2.1.0$^{2,7}$.0$^{3,5}$]undec-10,11-ylene-di[oxy(mono- and polyalkyleneoxy)alkanols] which result from the monoepoxidation of the reaction products of tricyclo[5.2.1.0$^{2,6}$]dec-3-ene-9,10-diol with a saturated aliphatic mono vicinal-epoxyhydrocarbon,
(q) the 10-oxapentacyclo[6.3.1$^{3,6}$.0$^{2,7}$.0$^{9,11}$]tridec-4-oxy mono- and polyalkyleneoxy)alkanols which result from the monoepoxidation of the reaction products of tetracyclo[6.2.1.1$^{3,6}$.0$^{2,7}$]dodec-9-en-4-ol with a saturated aliphatic mono vicinal-epoxyhydrocarbon,
(r) the 10 - oxapentacyclo[6.3.1.1$^{3,6}$.0$^{2,}$.0$^{9,11}$]tridec - 4,5-ylene - di[oxy(mono- and polyalkyleneoxy)alkanols] which result from the monoepoxidation of the reaction products of tetracyclo[t.2.1.1$^{3,6}$.0$^{2,7}$]dodec-9-en-4,5-diol with a saturated aliphatic mono vicinal-epoxyhydrocarbon,
(s) 10-oxapentacyclo[6.3.1.1$^{3,6}$.0$^{2,7}$.0$^{9,11}$]tridec-4-ylalkyleneoxyalkanol,
(t) the 10-oxapentacyclo[6.3.1.1$^{3,6}$.0$^{2,7}$.0$^{9,11}$]tridec-4-ylalkyleneoxy(mono- and polyalkyleneoxy)alkanols which result from the monoepoxidation of the reaction products of tetracyclo[6.2.1.1$^{3,5}$.0$^{2,7}$]dodec-9-en-4-ylalkanol with a saturated aliphatic mono vicinal-epoxyhydrocarbon,
(u) 10-oxapentacyclo[6.3.1.1$^{3,6}$.0$^{2,7}$.0$^{9,11}$]tridec-4,5-ylene-di(alkyleneoxyalkanol), and
(v) the 10-oxapentacyclo[6.3.1.1$^{3,6}$.0$^{2,7}$.0$^{9,11}$]tridec-4,5-ylene-di[alkyleneoxy(mono- and polyalkyleneoxy)alkanols] which result from the monoepoxidation of the reaction products of tetracyclo[6.2.1.1$^{3,6}$.0$^{2,7}$]dodec-9-en-4,5-ylene-dialkanol with a saturated aliphatic mono vicinal-epoxyhydrocarbon.

Specific examples of the 4-oxatetracyclo[6.2.1.0$^{2,7}$.0$^{3,5}$]undec-9-oxyalkanols include, for instance, 4-oxatetracyclo[6.2.1.0$^{2,7}$.0$^{3,5}$]undec-9-oxy-*n*-pentanol,
4-oxatetracyclo[6.2.1.0$^{2,7}$.0$^{3,5}$]undec-9-oxyethanol,
4-oxatetracyclo[6.2.1.0$^{2,7}$.0$^{3,5}$]undec-9-oxy-*n*-propanol,
4-oxatetracyclo[6.2.1.0$^{2,7}$.0$^{3,5}$]undec-9-oxyisopropanol,
4-oxatetracyclo[6.2.1.0$^{2,7}$.0$^{3,5}$]undec-9-oxy-*n*-butanol,
4-oxatetracyclo[6.2.1.0$^{2,7}$.0$^{3,5}$]undec-9-oxyisobutanol,
4-oxatetracyclo[6.2.1.0$^{2,7}$.0$^{3,5}$]undec-9-oxy-*t*-butanol,
4-oxatetracyclo[6.2.1.0$^{2,7}$.0$^{3,5}$]undec-9-oxy-*n*-hexanol,
4-oxatetracyclo[6.2.1.0$^{2,7}$.0$^{3,5}$]undec-9-oxy-*n*-octanol,
4-oxatetracyclo[6.2.1.0$^{2,7}$.0$^{3,5}$]undec-9-oxy-*n*-decanol,
and the like.

Illustrative examples of the 4-oxatetracyclo[6.2.1.0$^{2,7}$.0$^{3,5}$]undec-9-oxyalkane-poly-ols which are contemplated include for instance, the 4-oxatetracyclo[6.2.1.0$^{2,7}$.0$^{3,5}$]undec-9-oxyalkanediols, e.g.,
the 4-oxatetracyclo[6.2.1.0$^{2,7}$.0$^{3,5}$]undec-9-oxypropanediols,
the 4-oxatetracyclo[6.2.1.0$^{2,7}$.0$^{3,5}$]undec-9-oxybutanediols,
the 4-oxatetracyclo[6.2.1.0$^{2,7}$.0$^{3,5}$]undec-9-oxypentanediols,
the 4-oxatetracyclo[6.2.1.0$^{2,7}$.0$^{3,5}$]undec-9-oxyhexanediols, and the like;
the 4-oxatetracyclo[6.2.1.0$^{2,7}$.0$^{3,5}$]undec-9-oxyalkanetriols, e.g.,
the 4-oxatetracyclo[6.2.1.0$^{2,7}$.0$^{3,5}$]undec-9-oxybutanetriols,
the 4-oxatetracyclo[6.2.1.0$^{2,7}$.0$^{3,5}$]undec-9-oxypentanetriols,
the 4-oxatetracyclo[6.2.1.0$^{2,7}$.0$^{3,5}$]undec-9-oxyhexanetriols,
the 4-oxatetracyclo[6.2.1.0$^{2,7}$.0$^{3,5}$]undec-9-oxyoctanetriols, and the like;
the 4-oxatetracyclo[6.2.1.0$^{2,7}$.0$^{3,5}$]undec-9-oxyalkanetetrols, e.g.,
the 4-oxatetracyclo[6.2.1.0$^{2,7}$.0$^{3,5}$]undec-9-oxyhexanetetrols; and the like;
the 4-oxatetracyclo[6.2.1.0$^{2,7}$.0$^{3,5}$]undec-9-oxyalkanepentols;
and the like.

Typical 10-oxapentacyclo[6.3.1.1$^{3,6}$.0$^{2,7}$.0$^{9,11}$]tridec-4-ylalkanols include, among others, 10-oxapentacyclo[6.3.1.1$^{3,6}$.0$^{2,7}$.0$^{9,11}$]tridec-4-ylmethanol,
10-oxapentacyclo[6.3.1.1$^{3,6}$.0$^{2,7}$.0$^{9,11}$]tridec-4-ylethanol,
10-oxapentacyclo[6.3.1.1$^{3,6}$.0$^{2,7}$.0$^{9,11}$]tridec-4-yl-*n*-propanol,
10-oxapentacyclo[6.3.1.1$^{3,6}$.0$^{2,7}$.0$^{9,11}$]tridec-4-ylisopropanol,
10-oxapentacyclo[6.3.1.1$^{3,6}$.0$^{2,7}$.0$^{9,11}$]tridec-4-yl-*n*-butanol,
10-oxapentacyclo[6.3.1.1$^{3,6}$.0$^{2,7}$.0$^{9,11}$]tridec-4-ylisobutanol,
10-oxapentacyclo[6.3.1.1$^{3,6}$.0$^{2,7}$.0$^{9,11}$]tridec-4-ylisohexanol,
10-oxapentacyclo[6.3.1.1$^{3,6}$.0$^{2,7}$.0$^{9,11}$]tridec-4-yl-n-octan-2-ol,
10-oxapentacyclo[6.3.1.1$^{3,6}$.0$^{2,7}$.0$^{9,11}$]tridec-4-yl-n-decanol,
and the like.

Among the 10-oxapentacyclo[6.3.1.1$^{3,6}$0$^{2,7}$.0$^{9,11}$]tridec-4-oxyalkanols which are encompassed within the scope of the invention are, for example, 10-oxapentacyclo[6.3.1.1$^{3,6}$.0$^{2,7}$.0$^{9,11}$]tridec-4-oxy-n-pentanol,
10-oxapentacyclo[6.3.1.1$^{3,6}$.0$^{2,7}$.0$^{9,11}$]tridec-4-oxyethanol,
10-oxapentacyclo[6.3.1.1$^{3,6}$.0$^{2,7}$.0$^{9,11}$]tridec-4-oxy-n-propanol,
10-oxapentacyclo[6.3.1.1$^{3,6}$.0$^{2,7}$.0$^{9,11}$]tridec-4-oxyisopropanol,
10-oxapentacyclo[6.3.1.1$^{3,6}$.0$^{2,7}$.0$^{9,11}$]tridec-4-oxy-n-butanol,
10-oxapentacyclo[6.3.1.1$^{3,6}$.0$^{2,7}$.0$^{9,11}$]tridec-4-oxyisobutanol,
10-oxapentacyclo[6.3.1.1$^{3,6}$.0$^{2,7}$.0$^{9,11}$]tridec-4-oxy-t-butanol,
10-oxapentacyclo[6.3.1.1$^{3,6}$.0$^{2,7}$.0$^{9,11}$]tridec-4-oxy-n-hexanol,
10-oxapentacyclo[6.3.1.1$^{3,6}$.0$^{2,7}$.0$^{9,11}$]tridec-4-oxy-n-octan-4-ol,
10-oxapentacyclo[6.3.1.1$^{3,6}$.0$^{2,7}$.0$^{9,11}$]tridec-4-oxy-n-dodecanol,
and the like.

Illustrative 10-oxapentacyclo[6.3.1.1$^{3,6}$.0$^{2,7}$.0$^{9,11}$]tridec-4-oxyalkane-poly-ols include, for instance, the 10-oxapentacyclo[6.3.1.1$^{3,6}$.0$^{2,7}$.0$^{9,11}$]tridec-4-oxyalkanediols, e.g., the 10-oxapentacyclo[6.3.1.1$^{3,6}$.0$^{2,7}$.0$^{9,11}$]tridec-4-oxypropanediols,
the 10-oxapentacyclo[6.3.1.1$^{3,6}$.0$^{2,7}$.0$^{9,11}$]tridec-4-oxybutanediols,
the 10-oxapentacyclo[6.3.1.1$^{3,6}$.0$^{2,7}$.0$^{9,11}$]tridec-4-oxypentanediols,
the 10-oxapentacyclo[6.3.1.1$^{3,6}$.0$^{2,7}$.0$^{9,11}$]tridec-4-oxyhexanediols, and the like;
the 10-oxapentacyclo[6.3.1.1$^{3,6}$.0$^{2,7}$.0$^{9,11}$]tridec-4-oxyalkanetriols, e.g.,
the 10-oxapentacyclo[6.3.1.1$^{3,6}$.0$^{2,7}$.0$^{9,11}$]tridec-4-oxybutanetriols,
the 10-oxapentacyclo[6.3.1.1$^{3,6}$.0$^{2,7}$.0$^{9,11}$]tridec-4-oxypentanetriols,
the 10-oxapentacyclo[6.3.1.1$^{3,6}$.0$^{2,7}$.0$^{9,11}$]tridec-4-oxyhexanetriols,
the 10-oxapentacyclo[6.3.1.1$^{3,6}$.0$^{2,7}$.0$^{9,11}$]tridec-4-oxyoctanetriols,
the 10-oxapentacyclo[6.3.1.1$^{3,6}$.0$^{2,7}$.0$^{9,11}$]tridec-4-oxynonanetriols, and the like;
the 10-oxapentacyclo[6.3.1.1$^{3,6}$.0$^{2,7}$.0$^{9,11}$]tridec-4-oxyalkanetetrols, e.g.,
the 10-oxapentacyclo[6.3.1.1$^{3,6}$.0$^{2,7}$.0$^{9,11}$]tridec-4-oxyhexanetetrols, and the like;
the 10-oxapentacyclo[6.3.1.1$^{3,6}$.0$^{2,7}$.0$^{9,11}$]tridec-4-oxyalkanepentols; and the like.

Typical 10-oxapentacyclo[6.3.1.1$^{3,6}$.0$^{2,7}$.0$^{9,11}$]-tridec-4-ylmethyleneoxyalkanols include, among others, 10-oxapentacyclo[6.3.1.1$^{3,6}$.0$^{2,7}$.0$^{9,11}$]tridec-4-ylmethylene-oxy-n-pentanol,
10-oxapentacyclo[6.3.1.1$^{3,6}$.0$^{2,7}$.0$^{9,11}$]tridec-4-ylmethylene-oxyethanol,
10-oxapentacyclo[6.3.1.1$^{3,6}$.0$^{2,7}$.0$^{9,11}$]tridec-4-ylmethylene-oxy-*n*-propanol,
10-oxapentacyclo[6.3.1.1$^{3,6}$.0$^{2,7}$.0$^{9,11}$]tridec-4-ylmethylene-oxyisopropanol,
10-oxapentacyclo[6.3.1.1$^{3,6}$.0$^{2,7}$.0$^{9,11}$]tridec-4-ylmethylene-oxy-*n*-butanol,
10-oxapentacyclo[6.3.1.1$^{3,6}$.0$^{2,7}$.0$^{9,11}$]tridec-4-ylmethylene-oxy-*t*-butanol,
10-oxapentacyclo[6.3.1.1$^{3,6}$.0$^{2,7}$.0$^{9,11}$]tridec-4-ylmethylene-oxy-*n*-hexanol, 10-oxapentacyclo[6.3.1.1$^{3,6}$.0$^{2,7}$.0$^{9,11}$]tridec-4-ylmethylene-n-octanol,
10-oxapentacyclo[6.3.1.1$^{3,6}$.0$^{2,7}$.0$^{9,11}$]tridec-4-ylmethylene-oxy-n-dodecanol, and the like.

Illustrative 10 - oxapentacyclo[6.3.1.1$^{3,6}$.0$^{2,7}$.0$^{9,11}$]-tridec-4-ylmethyleneoxyalkane-poly-ols which are contemplated include, for instance, the 10 - oxapentacyclo-[6.3.1.1$^{3,6}$.0$^{2,7}$.0$^{9,11}$]tridec - 4 - ylmethyleneoxyalkanediols, e.g., the 10-oxapentacyclo[6.3.1.1$^{3,6}$.0$^{2,7}$.0$^{9,11}$]tridec-4-yl-methyleneoxypropanediols,
the 10-oxapentacyclo[6.3.1.1$^{3,6}$.0$^{2,7}$.0$^{9,11}$]tridec-4-yl-methyleneoxybutanediols,
the 10-oxapentacyclo[6.3.1.1$^{3,6}$.0$^{2,7}$.0$^{9,11}$]tridec-4-yl-methyleneoxypentanediols,
the 10-oxapentacyclo[6.3.1.1$^{3,6}$.0$^{2,7}$.0$^{9,11}$]tridec-4-yl-methyleneoxyhexanediols,
the 10-oxapentacyclo[6.3.1.1$^{3,6}$.0$^{2,7}$.0$^{9,11}$]tridec-4-yl-methyleneoxyoctanediols, and the like;
the 10-oxapentacyclo[6.3.1.1$^{3,6}$.0$^{2,7}$.0$^{9,11}$]tridec-4-yl-methyleneoxayalkanetriols, e.g.,
the 10-oxapentacyclo[6.3.1.1$^{3,6}$.0$^{2,7}$.0$^{9,11}$]tridec-4-yl-methyleneoxybutanetriols,
the 10-oxapentacyclo[6.3.1.1$^{3,6}$.0$^{2,7}$.0$^{9,11}$]tridec-4-yl-methyleneoxypentanetriols,
the 10-oxapentacyclo[6.3.1.1$^{3,6}$.0$^{2,7}$.0$^{9,11}$]tridec-4-yl-methyleneoxyhexanetriols,
the 10-oxapentacyclo[6.3.1.1$^{3,6}$.0$^{2,7}$.0$^{9,11}$]tridec-4-yl-methyleneoxyoctanetriols,
the 10-oxapentacyclo[6.3.1.1$^{3,6}$.0$^{2,7}$.0$^{9,11}$]tridec-4-yl-methyleneoxynonanetriols, and the like;
the 10-oxapentacyclo[6.3.1.1$^{3,6}$.0$^{2,7}$.0$^{9,11}$]tridec-4-yl-methyleneoxyalkanetetrols, e.g.,
the 10-oxapentacyclo[6.3.1.1$^{3,6}$.0$^{2,7}$.0$^{9,11}$]tridec-4-yl-methyleneoxyhexanetetrols, and the like;
the 10-oxapentacyclo[6.3.1.1$^{3,6}$.0$^{2,7}$.0$^{9,11}$]tridec-4-yl-methyleneoxyalkanepentols; and the like.

The 10 - oxapentacyclo[6.3.1.1$^{3,6}$.0$^{2,7}$.0$^{9,11}$]tridec - 4,5-ylene-dialkanols are exemplified, preferably, by such compounds as 10-oxapentacyclo[6.3.1.1$^{3,6}$.0$^{2,7}$.0$^{9,11}$]tridec-4,5-ylene-dimethanol, 10 - oxapentacyclo[6.3.1.1$^{3,6}$.0$^{2,7}$.0$^{9,11}$]-tridec-4,5-ylene-diethanol, and the like.

The preparation of 4 - oxatetracyclo[6.2.1.0$^{2,7}$.0$^{3,5}$]-undecan-9-ol is effected by the reaction of dicyclopentadiene with an aqueous solution of an inorganic acidic catalyst, e.g., an aqueous solution of 25 weight percent sulfuric acid, at an elevated temperature, e.g., from about 75° C. and lower, to about 125° C., and higher, and for a period of time sufficient to produce tricyclo[5.2.1.0$^{2,6}$]dec-3-en-8-ol as the product. Epoxidation of the resulting olefinically unsaturated alcohol product results in 4-oxatetracyclo[6.2.1.0$^{2,7}$.0$^{3,5}$]undecan - 9 - ol. It is pointed out at this time that the epoxidation reaction of the olefinically unsaturated alcohol precursors which result in the monoepoxy alcohol compounds that are employed as a component(s) in the novel curable systems of the invention will be described in detail at a later section of the specification.

The preparation of 4-oxatetracyclo[6.2.1.0$^{2,7}$.0$^{3,5}$]undec-9-oxyalkanol, 4 - oxatetracyclo[6.2.1.0$^{2,7}$.0$^{3,5}$]undec-9-oxyalkane-poly-ol, 10 - oxapentacyclo[6.3.1.1$^{3,6}$.0$^{2,7}$.0$^{9,11}$]tridec-4-oxyalkanol, or 10-oxapentacyclo[6.3.1.1$^{3,6}$.0$^{2,7}$.0$^{9,11}$]tridec-4-oxyalkane - poly - ol is accomplished, for example, by reacting a molar excess of a polyhydric alcohol, e.g., ethylene glycol, glycerol, 1,2,6-hexanetriol, erythritol, pentaerythritol, and the like, with dicyclopentadiene or tetracyclo[6.2.1.1$^{3,6}$.0$^{2,7}$]dodeca-4,9-diene, in the presence of boron trifluoride catalyst, at an elevated temperature, e.g., from about 50° C. and lower, to about 125° C., and higher, and for a period of time to produce tricyclo[5.2.1.0$^{2,6}$]dec-3-en-8-oxyalkanol, tricyclo[5.2.1.0$^{2,6}$]dec-3-en - 8 - oxyalkane-poly-ol, tetracyclo[6.2.1.1$^{3,6}$.0$^{2,7}$]dodec-9-en - 4 - oxyalkanol, or tetracyclo[6.2.1.1$^{3,6}$.0$^{2,7}$]dodec-9-en - 4 - oxyalkane-poly-ol as the product. Epoxidation of the resulting product gives the monoepoxy alcohol compounds under consideration.

The preparation of 4-oxatetracyclo[6.2.1.0$^{2,7}$.0$^{3,5}$]undecane-9,10-diol or 10-oxapentacyclo[6.3.1.1$^{3,6}$.0$^{2,7}$.0$^{9,11}$] tridecane-4,5-diol is effected, for example, by reacting dicyclopentadiene or tetracyclo[6.2.1.1$^{3,6}$.0$^{2,7}$]dodeca - 4,9-diene with aqueous hydrogen peroxide (equimolar concentration), in the presence of osmium tetraoxide catalyst, at an elevated temperature, and for a period of time sufficient to produce tricyclo[5.2.1.0$^{2,6}$]dec-3-ene-8,9-diol or tetracyclo[6.2.1.1$^{3,6}$.0$^{2,7}$]dodec-9-ene - 4,5 - diol as the product. Epoxidation of the resulting product produces the monoepoxy alcohol compound.

Monomeric 4 - oxatetracyclo[6.2.1.0$^{2,7}$.0$^{3,5}$]undecane-10,11-diol can be prepared by the reaction of dicyclopentadiene and lead tetraacetate, under the influence of heat, to yield tricyclo[5.2.1.0$^{2,6}$]dec-3-ene-9,10-diol, followed by epoxidizing said diol to obtain the monoepoxy alcohol compound in question.

The preparation of 10-oxapentacyclo[6.3.1.1$^{3,6}$.0$^{2,7}$.0$^{9,11}$]tridecan-4-ol is as follows. The Diels-Alder reaction of equimolar quantities of cyclopentadiene and vinyl acetate results in 5-acetoxy-bicyclo[2.2.1]hept-2-ene. Subsequent reaction of the bicyclo product with cyclopentadiene yields 4-acetoxy - tetracyclo[6.2.1.1$^{3,6}$.0$^{2,7}$]dodec-9-ene. The reaction of the tetracyclo product with potassium hydroxide yields tetracyclo[6.2.1.1$^{3,6}$.0$^{2,7}$]dodec-9-en-4-ol which can be epoxidized to give the monoepoxy alcohol compound under discussion.

The preparation of 10-oxapentacyclo[6.3.1.1$^{3,6}$.0$^{2,7}$.0$^{9,11}$]tridec-4-ylmethyleneoxyalkanol, 10 - oxapentacyclo[6.3.1.1$^{3,6}$.0$^{2,7}$.0$^{9,11}$]tridec - 4 - ylmethyleneoxyalkane-poly-ol, 10 - oxapentacyclo[6.3.1.1$^{3,6}$.0$^{2,7}$.0$^{9,11}$]tridec-4-ylalkanol, or 10 - oxapentacyclo[6.3.1.1$^{3,6}$.0$^{2,7}$.0$^{9,11}$]tridec - 4,5-ylene-dialkanol, also, can be prepared via the Diels-Alder synthesis route, followed by epoxidizing the Diels-Alder product. For instance, the reaction of at least two mols of cyclopentadiene with one mole of alkenol, allyl hydroxyalkyl ether, allyl polyhydroxyalkyl ether, or alkenediol will yield tetracyclo[6.2.1.1$^{3,6}$.0$^{2,7}$]dodec-9-en-4-ylalkanol, tetracyclo[6.2.1.1$^{3,6}$.0$^{2,7}$]dodec-9-en-4 - ylmethyleneoxyalkanol, tetracyclo[6.2.1.1$^{3,6}$.0$^{2,7}$]dodec - 9-en-4-ylmethyleneoxyalkane-poly-ol, or tetracyclo[6.2.1.1$^{3,6}$.0$^{2,7}$] dodec-9-en-4,5-ylene-dialkanol, respectively. Epoxidation of these olefinically unsaturated alcohol precursors will produce the monoepoxy alcohol compounds under consideration.

The 4-oxatetracyclo[6.2.1.0$^{2,7}$.0$^{3,5}$]undec-9-oxy(mono- and polyalkyleneoxy)alkanols can be prepared by reacting one mol of tricyclo[5.2.1.0$^{2,6}$]dec-3-en-8-ol with at least two moles and upwards to 100 mols, or more, of a saturated aliphatic mono vicinal-epoxyhydrocarbon (hereinafter termed "olefin oxide"), e.g., ethylene oxide, 1,2 - epoxypropane, 1,2 - epoxybutane, 2,3 - epoxybutane, styrene oxide, 1,2-epoxyoctane, 1,2-epoxydodecane, 1,2-epoxyoctadecane, 1 - phenyl - 2,3 - epoxybutane, 1-cyclohexyl-2,3-epoxypentane, and the like; in the presence of an alkali metal hydroxide catalyst, e.g., about 0.1 weight percent potassium hydroxide, based on the total weight of the reactants; under essentially anhydrous conditions; and at an elevated temperature, e.g., from about 90° C., and lower, to about 140° C., and higher. If desired, the reaction product mixture can be purified by washing with water or an aqueous acetic acid solution to remove or neutralize the residual catalyst. The resulting product, i.e., tricyclo[5.2.1.0$^{2,6}$]dec-3-en-8-oxy(mono- or polyalkyleneoxy)alkanol, then can be reacted with an epoxidizing agent to yield the monoepoxy alcohol compound. The following structural formula characterizes the 4-oxatetracyclo[6.2.1.0$^{2,7}$.0$^{3,5}$]undec - 9 - oxy(mono- and polyalkyleneoxy)alkanols:

VI

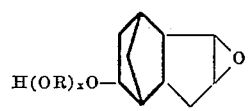

wherein $x$ is a number having an average value of at least 2 (and upwards to 100, and greater), and wherein R is a divalent saturated aliphatic hydrocarbon radical. It is to be noted that $x$ has an average value since the epoxy alcohol product which results from the reaction is not composed of discrete, identical molecules, but rather, the product is composed of molecules in which the value for $x$ can vary over a broad range.

The 4 - oxetetracyclo[6.2.1.0$^{2,7}$.0$^{3,5}$]undec-9,10-ylene-di[oxy(mono- and polyalkyleneoxy)alkanols] can be prepared by reacting one mol of tricyclo[5.2.1.0$^{2,6}$]dec-3-ene-8,9-diol with at least 4 mols of an olefin oxide, followed by epoxidation, in the manner explained supra. These monoepoxy alcohols can be characterized as follows:

VII
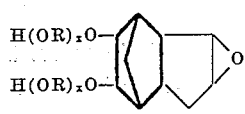

wherein each $x$, individually, is a number having an average value of at least 2 (and upwards to 100 and greater), and wherein R is a divalent saturated aliphatic hydrocarbon radical.

The 4 - oxatetracyclo[6.2.1.0$^{2,7}$.0$^{3,5}$]undec-10,11-ylene-di[oxy(mono- and polyalkyleneoxy)alkanols] can be prepared by the reaction of one mol of tricyclo[5.2.1.0$^{2,6}$]dec-3-ene-9,10-diol with at least 4 mols of an olefin oxide, followed by epoxidation, in the manner explained supra. These monoepoxy alcohols have the following structural formula:

VIII
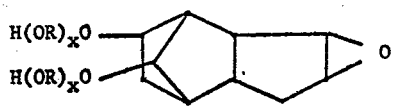

wherein $x$ and R have the values set forth in Formula VII supra.

The 10 - oxapentacyclo[6.3.1.1$^{3,6}$.0$^{2,7}$.0$^{9,11}$]tridec-4-oxy(mono- and polyalkyleneoxy)alkanols are prepared by reacting one mol of tetracyclo[6.2.1.1$^{3,6}$.0$^{2,7}$]dodec-9-en-4-ol with at least 2 mols of an olefin oxide, followed by epoxidation, in the manner explained supra. These monoepoxy alcohols are characterized by the following structural formula:

IX

wherein $x$ and R have the values set forth in Formula VII supra.

The 10 - oxapentacyclo[6.3.1.1$^{3,6}$.0$^{2,7}$.0$^{9,11}$]tridec - 4,5-ylene-di[oxy(mono- and polyalkyleneoxy)alkanols] are prepared by the reaction of at least 4 mols of an olefin oxide per mol of tetracyclo[6.2.1.1$^{3,6}$.0$^{2,7}$]dodec-9-ene-4,5-diol, followed by epoxidation, in the manner explained supra. The resulting monoepoxy alcohols are thusly characterized:

X
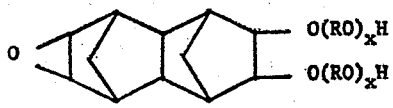

wherein $x$ and R have the values set forth in Formula VII supra.

The 10 - oxapentacyclo[6.3.1.1$^{3,6}$.0$^{2,7}$.0$^{9,11}$]tridec - 4-ylalkyleneoxyalkanols can be prepared by the reaction of equimolar quantities of tetracyclo[6.2.1.1$^{3,6}$.0$^{2,7}$]dodec-9-en-4-ylalkanol and an olefin oxide, followed by epoxidation, in the manner explained supra. These monoepoxy alcohols have the following formula:

XI
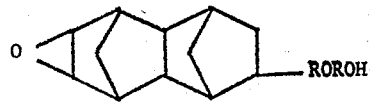

wherein each R can be the same or different divalent saturated aliphatic hydrocarbon radicals.

The 10 - oxapentacyclo[6.3.1.1$^{3,6}$.0$^{2,7}$.0$^{9,11}$]tridec - 4-ylalkyleneoxy(mono- and polyalkyleneoxy)alkanols can be prepared by the reaction of at least 2 mols of an olefin oxide per mol of tetracyclo[6.2.1.1$^{3,6}$.0$^{2,7}$]dodec-9-en-4-ylalkanol, then epoxidizing, in the manner explained supra. The following structural formula illustrates these monoepoxy alcohol compounds:

XII
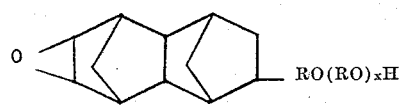

wherein each R, individually, is a divalent saturated aliphatic hydrocarbon radical, and wherein $x$ is a number having an average value of at least 2.

The 10 - oxapentacyclo[6.3.1.1$^{3,6}$.0$^{2,7}$.0$^{9,11}$]tridec - 4,5-ylene-di(alkyleneoxyalkanols) are obtained by reacting two mols of an olefin oxide per mol of tetracyclo[6.2.1.1$^{3,6}$.0$^{2,7}$]dodec-9-en-4,5 - ylene - dialkanol, followed by epoxidation, in the manner explained supra. The following formula characterizes the monoepoxy alcohols under consideration:

XIII
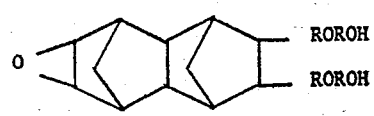

wherein each R can be the same or different divalent saturated aliphatic hydrocarbon radicals.

The 10 - oxapentacyclo[6.3.1.1$^{3,6}$.0$^{2,7}$.0$^{9,11}$]tridec - 4,5-ylene-di[alkyleneoxy(mono- and polyalkyleneoxy)alkanols] are prepared by the reaction of at least 4 mols of an olefin oxide per mol of tetracyclo[6.2.1.1$^{3,6}$.0$^{2,7}$]dodec-9-en-4,5-ylene-dialkanol, followed by epoxidation, in the manner explained supra. The following structural formula illustrates the monoepoxy alcohols under discussion:

XIV
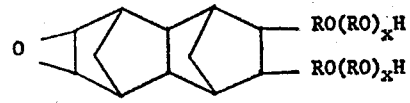

wherein each R, individually, is a divalent saturated aliphatic hydrocarbon radical, and wherein $x$ is a number having an average value of at least 2.

It is to be understood that the oxymethyleneoxy radical, i.e., —OCH$_2$O—, is not encompassed within the scope of the monoepoxy alcohol compounds which are employed in the preparation of the novel polyhydric polymers.

The monoepoxy alcohol compounds can be prepared by the reaction of the corresponding olefinically unsaturated alcohol precursor with an epoxidizing agent. Among the epoxidizing agents contemplated include, for example, the aliphatic peracids, the cycloaliphatic peracids, the aromatic peracids, and the like. The organic hydrocarbon peracids are preferred. Illustrative peracids include, for instance, peracetic acid, perpropionic acid, perbutyric acid, perhexanoic acid, peroctanoic acid, perdodecanoic acid, perbenzoic acid, monoperphthalic acid, and the like. The lower aliphatic hydrocarbon peracids which contain from 2 to 4 carbon atoms are highly suitable. Peracetic acid is most preferred. It is highly desirable to employ the peracid as a solution in an inert normally liquid organic vehicle such as ethyl acetate, butyl acetate, acetone, and the like. A solution comprising from about 10 to 50 weight percent of peracid, based on the total weight of peracid and inert organic vehicle is suitable; from about 20 to 40 weight percent of peracid is preferred. The epoxidation reaction can be conducted at a temperature in the range of from about 0° C., and lower, to about 100° C., and higher, and preferably, from about 20° to about 80° C. Theoretically, to effect complete epoxidation of the olefinically unsaturated alcohol precursor, equimolar quantities of peracid and precursor should be employed. However, since some degradation of the peracid occurs during the epoxidation reaction, it is desirable to employ a quantity of peracid in excess of that theoretically required to effect essentially complete epoxidation of said precursor, e.g., from about 1.1 to about 10, and higher, mols of peracid per mol of precursor. The expoxidation reaction is conducted for a period of time sufficient to introduce oxirane oxygen at the site of the carbon to carbon double bond present in the precursor, e.g., from several minutes to several hours. Periodic analysis of samples of the reaction mixture to determine the quantity of peracid consumed during the epoxidation reaction can be readily performed by the operator by well established techniques and procedures. At the termination of the epoxidation reaction, any unreacted olefinic precursor, acid by-product, inert vehicle, if employed, and the like, can be recovered from the reaction product mixture, for example, by distillation under reduced pressure. Further well known purification techniques can be employed, as desired.

The second component of the novel coating compositions is a fatty acid or oil. The fatty acids which are suitable for use in preparing the novel compositions of this invention are the saturated and unsaturated monocarboxylic acids containing up to about twenty-two carbon atoms. Preferred aliphatic monocarboxylic acids include hexanoic acid, caprylic acid, lauric acid, capric acid, myristic acid, palmitic acid, stearic acid, arachidic acid, palmitoleic acid, oleic acid, linoleic acid, linolenic acid eleostearic acid, licanic acid, ricinoleic acid, hexenoic acid, hexadienoic acid, octenoic acid, and the like. It is advantageous for purposes of economy to employ mixtures of acids, particularly those derived from natural sources such as castor oil, dehydrated castor oil, coconut oil, cottonseed oil, linseed oil, oiticaca oil, perilla oil, olive oil, safflower oil, sardine oil, soybean oil, tall oil, tung oil (China wood oil), and the like.

In addition to the monoepoxy alcohol and fatty acid or oil, a third component is employed in the preparation of the novel coating compositions of this invention, that is, a polyfunctional acid or anhydride. The acids suitable for use in the present invention are polycarboxylic acids, that is, an acid having two or more carboxyl groups in the molecule.

Representative polycarboxylic acids include oxalic acid, malonic acid, succinic acid, glutaric acid, adipic acid, pimelic acid, suberic acid, azelaic acid, sebasic acid, alkylsuccinic acids, alkenylsuccinic acids, ethylbenzylsuccinic acid, maleic acid, fumaric acid, itaconic acid, citraconic acid, mesaconic acid, glutaconic acid, ethylidenemalonic acid, isopropylidenemalonic acid, allylmalonic acid, muconic acid, alphahydromuconic acid, betahydromuconic acid, diglycollic acid, dilactic acid, thiodiglycollic acid, 4-amyl-2,5-heptadienedioic acid, 3-hexynedoic acid, 1,2-cyclohexanedicarboxylic acid, 1,4-cyclohexanedicarboxylic acid, 2-carboxy-2-methylcyclohexaneacetic acid, phthalic acid, isophthalic acid, terephthalic acid, tetrahydrophthalic acid, tetrachlorophthalic acid, 1,8-naphthalenedicarboxylic acid, 3-carboxycinnamic acid, 1,2 - naphthalenedicarboxylic acid, 1,1,5 - pentanetricarboxylic acid, 1,2,4-hexanetricarboxylic acid, 2-propyl-1,2,4-pentanetricarboxylic acid, 5-octene-3,3,6-tricarboxylic acid, 1,2,3-propanetricarboxylic acid, 1,2,4-benzenetricarboxylic acid 3-hexene-2,2,3,4-tetracarboxylic acid, 1,2,3,4-benzenetetracarboxylic acid, 1,2,3,5-benzenetetracarboxylic acid, benzenepentacarboxylic acid, benzenehexacarboxylic acid, polymerized fatty acids derived from natural oils, e.g., linseed oil, tung oil, soybean oil, dehydrated castor oil, etc., including mixtures thereof, which have a molecular weight within the range of 500 to 5000, and the like, such as the dimer and trimer acids of commerce.

Also, as polycarboxylic acids useful in the novel coating compositions there are included compounds containing ester groups in addition to two or more carboxy groups which can be termed polycarboxy polyesters of polycarboxylic acids, such as those listed above, or the corresponding anhydrides of said acids, esterified with polyhydric alcohols. Stated in other words, by the term "polycarboxy polyesters," as used herein, is meant polyesters containing two or more carboxy groups per molecule. These polycarboxy polyesters can be prepared by known condensation procedures, employing mol ratios favoring greater than equivalent amounts of polycarboxylic acid, or anhydride.

Typical polycarboxylic acid anhydrides include succinic anhydride, glutaric anhydride, propylsuccinic anhydride, methylbutylsuccinic anhydride, hexylsuccinic anhydride, heptylsuccinic anhydride, pentenylsuccinic anhydride, octenylsuccinic anhydride, nonenylsuccinic anhydride, alpha, beta-diethylsuccinic anhydride, maleic anhydride, chloromaleic anhydride, dichloromaleic anhydride, itaconic anhydride, citraconic anhydride, hexahydrophthalic anhydride, hexachlorophthalic anhydride, tetrahydrophthalic anhydride, methyltetrahydrophthalic anhydride, tetrachlorophthalic anhydride; hexachloroendomethylenetetrahydrophthalic anhydride, otherwise known as chlorendic anhydride, tetrabromophthalic anhydride, tetraiodophthalic anhydride; phthalic anhydride, 4-nitrophthalic anhydride, 1,2-naphthalic anhydride; polymeric dicarboxylic acid anhydrides, or mixed polymeric dicarboxylic acid anhydrides such as those prepared by the autocondensation of dicarboxylic acids, for example, adipic acid, pimelic acid, sebacic acid, hexahydroisophthalic acid, terephthalic acid, isophthalic acid and the like. Also, other dicarboxylic acid anhydrides, useful in the coating compositions include the Diels-Alder adducts of maleic acid and alicyclic compounds having conjugated double bonds, e.g., methylbicyclo-[2.2.1]-heptent-2,3-dicarboxylic anhydride.

In its broad aspect, the novel compositions of this invention are prepared from the hereinbefore described reactants, by conventional alkyd resin production techniques which are well known to the art. Thus, for example, where a mixture of monobasic and polybasic reactants is employed, i.e., the fatty acid and polyfunctional component, the monobasic reactant can be dissolved in the polybasic reactant and the solution reacted with the alcohol at elevated temperatures and in the presence of a catalyst if desired. In a preferred procedure, all components of the alkyd resin are charged to a reaction vessel along with a catalyst and a high boiling organic solvent, the admixture is heated at a temperature and for a period of time sufficient for the removal of water of esterification and completion of the reaction.

As will be apparent hereinafter to those skilled in the art, the particular monoepoxy alcohol, fatty acid, and polyfunctional compound employed to prepared the alkyd resin depend upon the characteristics desired in the final product. For example, varying the polyfunctional compound will impart certain characteristic coating properties such as increased or decreased hardness, resistance to certain chemicals and the like. Likewise the choice of reactants will depend upon whether the resin is to be cured by slow oxidation and polymerization on exposure to air at room temperature or by baking.

The extent of esterification of the monoepoxy alcohol, that is, the ratio of the esterified hydroxyl groups to original hydroxyl groups is likewise dependent upon the intended application of the coating formulation prepared from the novel compositions and upon the compatibility of modifying components included in the coating formulation. Thus, for example, the extent of esterification would be from about 10 to about 50 percent where the composition is to be employed in conjunction with aminoplasts, thermoset acrylics, urethane resins or epoxy resins in chemically resistant coatings for appliances, furniture, automobiles, etc.; from about 30 to about 70 percent where the composition is to be employed as a pigment dispersant for vinyl resin compositions or as a plasticizer for nitrocellulose resins; from about 50 to about 80 percent where the composition is to be employed as a medium oil length vehicle for bake metal primers, maintenance paints, floor varnishes, etc.; and from about 70 to about 100 percent where the composition is to be employed as a long oil length vehicle for bake metal finishes, house paints, general purpose enamels, and the like.

The extent of esterification will of course be determined by the concentration and respective ratios of the second and third component of the admixture. The proportions of fatty acid and polyfunctional component which are employed in the esterification reaction are most conveniently expressed in terms of hydroxy groups (—OH) and carboxy groups (—COOH), or in the case of anhydrides in terms of carboxy equivalents, that is, the number of groups equivalent to carboxy groups. In general, it has been found that the proportions of monoepoxy alcohol, fatty acid, and polyfunctional component are desirably such that there is present in the admixture from about 0.1 to about 1.0 carboxy group of the fatty acid per hydroxy group of the monoepoxy alcohol, and from about 0.2 to about 3.0 carboxy group or carboxy equivalent of the polyfunctional component per epoxy group of the alcohol.

In practice it has been found that the preferred third component of the coating compositions of this invention is a mixture containing a major amount of tetrahydrophthalic anhydride and a minor amount of maleic anhydride. These reactants produce resins which possess good color, excellent solubility characteristics and coating properties as hereinafter indicated. In general, the ratio of tetrahydrophthalic anhydride to maleic anhydride should be at least about 2:1 and more preferably from about 2:1 to about 10:1.

In a highly preferred embodiment of this invention useful coating compositions which surpass many of the commercially available alkyd resins, are obtained by a careful control of the concentration of hydrolyzable and/or water sensitive groups in the polymer. It has been found that the concentration of these groups is an important factor in the overall water and alkali-resistance of the polymeric product. While the sensitivity caused by hydroxyl, ethers, and acids to water is greater than esters, only the ester group is hydrolyzable with alkali and hence the net effect of all appear to be about the same regardless of type when the overall chemical properties of the coating are considered. Thus, it has been found that an excessive concentration of ester, hydroxyl, acid or ether groups in the polymeric product, results in early failure of the coating when exposed to aqueous, particularly alkaline, environmental conditions. The percent oxygen has been used as a practical measure of the concentration of the aforesaid groups. It has been found that compositions having an oxygen content in the range of from about 12 to about 20 and more preferably from about 14 to about 18 weight percent, have excellent chemical resistance. The aforesaid oxygen fraction of the compositions of course does not include any oxygen absorbed from the air during the cure of the coatings. In some instances this may be as high as an additional 10–12 percent.

Catalysts which have been found suitable for use in the aforesaid reaction include among others the strong mineral acids, e.g., sulfuric acid, phosphoric acid, polyphosphoric acid, perchloric acid, and the like; the saturated aliphatic hydrocarbon sulfonic acids and the aromatic hydrocarbon sulfonic acids, e.g., ethylsulfonic acid, propylsulfonic acid, benzenesulfonic acid, toluenesulfonic acid, naphthalenesulfonic acid, lower alkyl substituted-benzenesulfonic acid, and the like. In addition, the tetraalkyl titanates, e.g., tetraethyl titanate, tetraisopropyl titanate, tetrabutyl titanate, and the like, also are contemplated. Basic catalysts also can be employed. Illustrative basic catalysts include, for instance, alkali metal catalysts, e.g., sodium hydroxide, potassium hydroxide, lithium hydroxide and the like; the amines, e.g., alphamethylbenzyldimethylamine, dimethylethylamine, triethylamine, tripropylamine, trimethylammonium hydroxide, and the like.

The concentration of the catalyst can range from about 0.01 and lower, to about 10.0, and higher, weight percent, based on the total weight of reactants.

Suitable solvents in which the esterification reaction can be conducted include normally liquid organic compounds in which the reactants are at least partially soluble and which are inert to the components of the formulation. Typical solvents include, for instance, the aromatic hydrocarbons, e.g., benzene, toluene, xylene, ethylbenzene, and the like; the saturated aliphatic and cycloaliphatic hydrocarbons, e.g., hexane, heptane, cyclopentane, cyclohexane, lower alkyl substituted-cyclohexane, and the like; the oxygenated organic compounds, e.g., acetone, methyl ethyl ketone, methyl isobutyl ketone, cyclohexanone, tetrahydrofuran, dioxane, and the like. The aromatic hydrocarbons are preferred.

The esterification reaction can be conducted at an elevated temperature, for example, a temperature at least about 75° C. and even lower. A suitable temperature range is from about 150° C. to about 300° C. and higher, and preferably, from about 150° C. to about 250° C. The reaction period can vary from several minutes to several days depending, of course, on factors such as the reaction temperature, the concentrations and reactivities of the reactants, the presence or absence of a catalyst, and the like. In general, a reaction period of from about 0.5 to about 24 hours is suitable. Water resulting from the esterification reaction can be removed by methods well known to the art.

If desired, the resulting esterified product can be recovered from the inert normally liquid organic vehicle (if one is employed) by various well known expediencies. The product can also be recovered from solution by heating to drive off the organic vehicle. In addition, the resulting product can be subjected to a wash treatment such as with water, an aqueous caustic solution, lower aliphatic alcohols, etc., to thus remove impurities therefrom. However, the compositions of this invention generally are obtained not recovered as solids but used in solution.

The products can be classified as drying compositions or non-drying compositions. The former are those which contain ethylenic unsaturation whereas the latter are saturated compositions. Both the drying and non-drying compositions are useful in those areas where alkyd resins, and the like are employed. These compositions are also outstanding as modifiers because they have a wide range of compatability, they impart improved caustic, water, and chemical resistance to the coatings they are modifying, and they impart improved flexibility and toughness.

The compositions of this invention are capable of "drying," or curing, to excellent protective coatings with or without the use of elevated temperatures. It is generally desirable to employ various metallic salts of organic compounds, which are known as driers, to accelerate the drying process. The drying can be accomplished at temperatures in the range between about 10° C. and 250° C. for a period of time sufficient to produce the desired properties in the coating. The drier compound is employed in a quantity between about 0.001 and 5.0 weight percent, based on the total weight of the composition. Suitable driers include soluble compounds containing heavy metals, e.g., cobalt, lead, manganese, calcium, zinc, iron, zirconium and the like. Examples of such driers include cobalt naphthenoate, lead octanoate, and the like. The compositions can be treated in the various ways familiar to the varnish and paint industry to produce special or advantageous effects.

As hereinbefore disclosed, both air-dried and baked coating compositions can be produced with the resin compositions of this invention. The novel resins described herein can be employed alone or in admixture with other resins, and, of course, with fillers and pigments, to produce coating compositions having numerous desirable characteristics. Fillers and pigments when added to the novel coating compositions produce special effects such as coloration, inhibition of corrosion, semigloss, gloss, decoration, increased hardness, and the like. The technology of fillers and pigment and their effects are well known in the art. Examples of pigments are chrome green, chrome yellow, iron oxides, silica, talc, titanium dioxide, zinc oxide, white lead, litharge, and the like.

The novel alkyd resins disclosed herein can be employed wherever conventional alkyd resins find application and are of particular utility in applications involving exposure to aqueous alkaline media because of their markedly improved resistance to boiling water and alkali as compared with conventional alkyds. The alkyd resins of this invention also possess other important advantages over the alkyd resins heretofore known to the art. Furthermore, the "rigid-ring backbone" of the polyols allows the incorporation of larger quantities of the fatty acids without sacrifice of film hardness as compared with conventional alkyd resins.

In the examples which follow, various tests were employed during the preparation and evaluation of the coating compositions. In general, the evaluation of the compositions as protective coatings involved the following:

(1) The adjustment of the solution viscosity, by the addition of xylene, to allow the preparation of films having a thickness of from 1.0 to 1.5 mils (thousandths of an inch).

(2) Cobalt octoate, 0.05 weight percent as cobalt, was then added to serve as a drier.

(3) Films were applied by dipping bonderized steel panels with a Fischer-Payne dip-coater.

(4) The resulting coated panels were either air dried for seven days at ambient conditions, i.e., room temperature, or baked for 30 minutes at 350° F.

(5) A coating was also applied to a glass plate to be used for obtaining Sward hardness values. Baked film thickness range from 1.0 to 1.5 mils.

(6) The impact resistance of coatings applied to bonderized steel at a thickness of 1.0–1.5 mils was measured with the Gardner impact tester. The tester comprises a round-nose steel impact rod, a vertical guide tube and a base plate. For measurements of impact resistance of coatings of this invention a special impact rod was designed to deliver up to 320 inch pounds of impact.

(7) The resulting coatings were then tested for flexibility according to ASTM Method D–522 Standard Method of Test Elongation of Attached Lacquer Films with Conical Mandrel Test Apparatus. Total diameter of the 180° bend varies from ⅛ to 1½ inches. Evulation of coatings is interpreted as either "pass" of "fail," depending on whether the coating remained intact or developed cracks of any sort after bending.

(8) Air dried coated panels were tested for water resistance by immersion in distilled water at 23–25° C. for 4 hours. The following ratings were used: Excellent—very slight blush; good—slight blush; fair—moderate blush; poor—heavy blush.

Baked coated panels were tested for water resistance by immersion in boiling water for one hour. The following ratings were used: Excellent—unaffected except for slight loss of gloss at air-water interface; good—slight blush, slight softening of film; fair—softening, moderate blush; poor—heavy blush, large blisters.

(9) Air dried coated panels were tested for caustic resistance by immersion in a 2 percent aqueous solution of sodium hydroxide for 4 hours. The following ratings were used: Excellent—very slight blush; good—slight to moderate blush; fair—moderate to heavy blush, blistering; poor—dissolved or disintegrated.

Baked coated panels were tested for caustic resistance by immersion in 20 percent aqueous sodium hydroxide for 24 hours. The following ratings were used: Excellent—no change in appearance or hardness; good—very slight softening; fair—slight softening, small blisters; poor—film dissolves.

(10) Air dried coated panels were tested for acid resistance by applying a one weight percent sulfuric acid solution in water to the coated panel. The test area was covered with a watch-glass fileld with the acid solutions and allowed to stand 4 hours. The following ratings were used: Excellent—softening; slight loss of adhesion; good—slight blush, no adhesion; fair—moderate blush, no adhesion, micro blisters; poor—heavy blush, no adhesion, small to large blisters.

Baked coated panels were tested for acid resistance in a similar manner only for a 24-hour period. The following ratings were used: Excellent—no change in appearance or hardness; good—very slight softening; fair—softening, whitening, and loss of adhesion; poor—blistering, heavy blush, loss of adhesion.

(11) The term "acid number" is defined as the number of milligrams of potassium hydroxide which are required to neturalize the free acid in a gram of substance. In the experimental examples, the "acid numbers" were determined by dissolving the sample for analysis in a solvent such as xylene and titrating with a standard alcoholic potassium hydroxide solution using phenolphthalein as the indicator. When a solvent was present with the reaction mixture being analyzed, the acid numbers were calculated for the solid, reactive component.

(12) Total solids present in the coating solution were determined by weighing about a one-gram sample of the solution into an aluminum weighing dish measuring about two inches in diameter, heating the open dish in a mechanically convected oven 160° C. for about 15 minutes, and after cooling to room temperature, the remaining residue was weighed.

The following examples are illustrative:

*Example 1*

The compound, tricyclo[5.2.1.0$^{2,6}$]dec-3-en-8-oxyethanol, was prepared by the reaction of ethylene glycol with tricyclo[5.2.1.0$^{2,6}$]deca-3-,8-diene in the presence of boron trifluoride catalyst. To 833 grams (0.29 mols) of tricyclo-[5.2.1.0$^{2,6}$]dec-3-en-8-oxyethanol maintained at about 40° C., there was added, dropwise, over a period of 3 hours, with stirring, 1,340 grams of a 26.8 weight percent solution of peracetic acid in ethyl acetate. The reaction was exothermic and consequently, the reaction vessel was occasionally cooled with ice. The resulting admixture was maintained at about 40° C. for an additional 3 hours plus standing overnight at room temperature, i.e., about 24° C. for about 15 hours. Analysis of the reaction product mixture indicated that the theoretical amount of peracid had been consumed. Subsequently, the reaction product mixture was diluted with ethylbenzene, and the volatiles, e.g., ethyl acetate, acetic acid by-product, etc., were removed therefrom by distillation under reduced pressure. There was obtained (via fractional distillation) 869 grams of a colorless liquid, i.e., 4-oxatetracyclo[6.2.1.0$^{2,7}$.0$^{3,5}$] undec-9-oxyethanol, which had the following properties:

Boiling point—134°–135° C./0.35 mm. of Hg.
$n_D^{30}$—1.5095.

*Elemental analysis.*—Found: carbon, 68.44%; hydrogen, 8.56%. Calculated: carbon, 68.54%; hydrogen, 8.63%.

The yield was 96 percent.

Example 2

The compound, tricyclo[5.2.1.0$^{2,6}$]dec-3-en-8-ol, was prepared by the reaction of tricyclo[5.2.1.0$^{2,6}$]deca-3,8-diene in the presence of an aqueous solution of sulfuric acid under the influence of heat. To 150 grams (1 mol) of tricyclo[5.2.1.0$^{2,6}$]dec-3-en-8-ol maintained at about 45°–50° C., there was added, dropwise, over a period of 55 minutes, with stirring, 308 grams of a 27.2 weight percent solution of peracetic acid in ethyl acetate. The resulting admixture then was maintained at about 45°–50° C. for an additional 2.25 hours. Analysis of the reaction product mixture indicated that the theoretical amount of peracid had been consumed. Subsequently, the reaction product mixture was diluted with ethylbenzene, and the volatiles, e.g., ethyl acetate, acetic acid by-product, etc., were removed therefrom by distillation under reduced pressure. There was obtained (via fractional distillation) 164 grams of a colorless liquid, i.e., 4-oxatetracyclo[6.2.1.0$^{2,7}$.0$^{3,5}$]undecan-9-ol which had the following properties:

Boiling point—130°–134° C./2.5 mm. of Hg.
$n_D^{30}$—1.5205.
Analysis for epoxide—96.9 percent.

Example 3

The compound, tetracyclo[6.2.1.1$^{3,6}$.0$^{2,7}$]dodec-9-en-4-ol (melting point of 87°–88° C.), is prepared by the saponification of the reaction product obtained by the Diels-Alder synthesis of cyclopentadiene and vinyl acetate. To 176 grams of tetracyclo[6.2.1.1$^{3,6}$.0$^{2,7}$]dodec-9-en-4-ol, there is added 0.2 gram of potassium hydroxide, followed by heating the resulting admixture to about 100°–120° with stirring. Ethylene oxide is fed into the stirred reaction mixture (below the liquid level) until the weight thereof increases by 44 grams. Then the resulting reaction product mixture is cooled, followed by neutralizing the catalyst with acetic acid. The reaction product mixture is washed twice with aqueous solution of sodium chloride, and then washed with water. The product, tetracyclo[6.2.1.1$^{3,6}$.0$^{2,7}$]dodec-9-en-4-oxyethanol, is dried at an elevated temperature under reduced pressure.

Example 4

To a mixture of 200 grams of tetracyclo[6.2.1.1$^{3,6}$.0$^{2,7}$]dodec-9-en-4-oxyethanol and 100 grams of ethyl acetate, there is added under stirring, dropwise, 278 grams of a 27.4 weight percent solution of peracetic acid in ethyl acetate. The reaction is exothermic and consequently, the reaction temperature is controlled at about 45° C. by the rate of addition. After 2.5 hours at this temperature, the reaction is essentially complete. The volatiles, acetic acid by-product, ethyl acetate, etc., are removed by co-distillation with ethylbenzene under reduced pressure. After stripping under high vacuum at about 100° C. there is obtained a yellow, viscous liquid product, i.e., 10-oxapentacyclo[6.3.1.1$^{3,6}$.0$^{2,7}$.0$^{9,11}$]tridec-4-oxyethanol. The infrared spectrum discloses the presence of epoxide and hydroxyl groups.

Example 5

The compound, tetracyclo[6.2.1.1$^{3,6}$.0$^{2,7}$]dodec-9-en-4-ylmethanol (boiling point of 100° C. at 0.5 mm. of Hg, and $n_D^{30}$ of 1.5362), is prepared via the Diels-Alder synthesis of cyclopentadiene and allyl alcohol. To 190 grams of tetracyclo[6.2.1.1$^{3,6}$.0$^{2,7}$]dodec-9-en-4-ylmethanol, there is added 0.2 gram of potassium hydroxide, followed by heating the resulting admixture to about 115°–130° C. with stirring. Ethylene oxide is fed into the stirred reaction mixture through a diffuser (below the liquid level) until the weight thereof increases by 43 grams. Then the resulting reaction product mixture is cooled, washed twice with ice water, and dried by heating to about 110° C. under a reduced pressure of 2 mm. of Hg. The resulting product, i.e., tetracyclo[6.2.1.1$^{3,6}$.0$^{2,7}$]dodec-9-en-4-ylmethyleneoxyethanol, is employed in Example 6 to follow.

Example 6

To a mixture of 210 grams of tetracyclo[6.2.1.1$^{3,6}$.0$^{2,7}$]dodec-9-en-4-ylmethyleneoxyethanol and 100 grams of ethyl acetate, there is added under stirring, dropwise, 330 grams of a 23 weight percent solution of peracetic acid in ethyl acetate. The reaction is exothermic and consequently, the reaction temperature is controlled to about 40°–50° C. by the rate of addition during the initial stage, and by mild heating in the latter stage. After 3 hours at this temperature, the reaction is essentially complete. The volatiles, acetic acid by-product, ethyl acetate, etc., are removed by co-distillation with ethyl benzene under reduced pressure. After stripping under high vacuum at about 110° C., there is obtained a yellow, viscous liquid product. The product, 10-oxapentacyclo[6.3.1.1$^{3,6}$.0$^{2,7}$.0$^{9,11}$]tridec-4-ylmethyleneoxyethanol, is identified by its infrared spectrum.

Example 7

(A) Tricyclo[5.2.1.0$^{2,6}$]dec-3-ene-9,10-diol (melting point of 90° C.) is prepared by the saponification of the reaction product of dicyclopentadiene and lead tetra-acetate. To a reaction vessel which contains 42 grams of the above said diol admixture and 42 grams of ethyl acetate maintained with stirring at about 30° C., there is added, dropwise, over a period of one hour 76 grams of a 26.5 weight percent solution of peracetic acid in ethyl acetate. The resulting solution is maintained at 30° C. for an additional 5 hours. The reaction is essentially complete as indicated by titration for peracetic acid. The volatile materials, i.e., ethyl acetate, acetic acid by-product, etc., are removed by co-distillation with ethylbenzene. The residue product, thus obtained, solidifies on standing and comprises a mixture of 4-oxatetracyclo[6.2.1.0$^{2,7}$.0$^{3,5}$]undecane-10,11-diol.

(B) In an analogous manner as above, tricyclo[5.2.1.0$^{2,6}$]-undec-3-ene-8,9-diol (which is prepared by the reaction of equimolar quantities of dicyclopentadiene and hydrogen peroxide in the presence of osmium tetroxide) is reacted with a solution of peracetic acid in ethyl acetate, to yield 4-oxatetracyclo[6.2.1.0$^{2,7}$.0$^{3,5}$]-undecane-9,10-diol.

Example 8

To a reaction vessel which contains 45 grams of ethyl acetate and 44 grams of tetracyclo[6.2.1.1$^{3,6}$.0$^{2,7}$]dodec-9-en-4,5-ylene-dimethanol (a white solid which is isolated from high boiling fractions, i.e., 140°–180° C./0.5 mm. of Hg, resulting from the Diels-Alder synthesis of cyclopentadiene and 2-butene-1,4-diol), maintained at about 30° C. with stirring, there is added, dropwise, over a period of one hour 42 grams of a 26 weight percent solution of peracetic acid in ethyl acetate. The resulting solution is maintained at 30° C. for an additional 5.5 hours to ensure completion of the reaction. The volatile materials, i.e., ethyl acetate, acetic acid by-product, etc., are removed by co-distillation with ethylbenzene. The residue product, thus obtained, solidifies on standing and is identified as 10-oxapentacyclo[6.3.1.1$^{3,6}$.0$^{2,7}$.0$^{9,11}$]tridec-4,5-ylene-dimethanol by its infrared absorption spectrum.

Example 9

To a reaction vessel which contains 40 grams of ethyl acetate and 40 grams of tetracyclo[6.2.1.1$^{3,6}$.0$^{2,7}$]dodec-9-ene-4,5-diol (which is prepared by the reaction of equimolar quantities of tetracyclo[6.2.1.1$^{3,6}$.0$^{2,7}$]dodeca-4,9-diene and hydrogen peroxide in the presence of osmium tetroxide) maintained at about 30° C. with stirring, there is added, dropwise, over a period of 1.5 hours 42 grams of a 26 weight percent solution of peracetic acid in ethyl acetate. The resulting solution is maintained at 30° C. for an additional 6 hours. At the end of this period of time the reaction is essentially complete as indicated by titration for peracetic acid. The volatile materials, i.e., ethyl acetate, acetic acid by-product, etc., are removed by co-distillation with ethylbenzene. The solid residue product, thus obtained, is identified as 10-oxapentacyclo[6.3.1.1$^{3,6}$.0$^{2,7}$.0$^{9,11}$]tridecane-4,5-diol by its infrared absorption spectrum.

*Example 10*

To 62 grams of tetracyclo[6.2.1.1$^{3,6}$.0$^{2,7}$]dodec-9-en-4-ol (melting point of 87°–88° C.; prepared by the saponification of the reaction product obtained by the Diels-Alder synthesis of cyclopentadiene and vinyl acetate) and 24 grams of ethyl acetate, maintained at about 50°–55° C., there was added to the resulting solution, dropwise, 120 grams of a 28.6 weight percent solution of peracetic acid in ethyl acetate over a period of 35 minutes. After an additional 2 hours at about 50°–55° C., the amount of peracetic acid consumed was 97.7% of the theoretical. The volatiles were removed from the reaction product mixture by co-distillation with ethylbenzene. There was obtained 77 grams of a viscous product identified as 10-oxapentacyclo[6.3.1.1$^{3,6}$.0$^{2,7}$.0$^{9,11}$]tridecan-4-ol.

*Example 11*

To 150 grams of tetracyclo[6.2.1.1$^{3,6}$.0$^{2,7}$]dodec-9-en-4-ylmethanol (boiling point of 100° C./0.5 mm. of Hg and $n_D^{30}$ of 1.5362; prepared by the Diels-Alder sythesis of cyclopentadiene and allyl alcohol) which was maintained with stirring at about 50°–55° C., there was added, dropwise, 232 grams of a 28.6 weight percent solution of peracetic acid niethyl acetate over a period of 70 minutes. After an additional one hour at about 50°–55° C., the amount of peracetic acid consumed was 98.5 percent of the theoretical. The volatiles were removed from the reaction product mixture by co-distillation with ethylbenzene. There was obtained 177 grams of a viscous product containing 10-oxapentacyclo[6.3.1.1$^{3,6}$.0$^{2,7}$.0$^{9,11}$]-tridec-4-ylmethanol.

*Example 12*

To a reaction vessel which contains 112 grams of tricyclo[5.2.1.0$^{2,6}$]dec-3-en-8-oxypropanediol (boiling point of 175°–180° C. and $n_D^{25}$ of 1.5186 prepared by the boron trifluoride-catalyzed addition of glycerol to dicyclopentadiene under the influence of heat), maintained at about 30° C. with stirring, there is added; dropwise, 168 grams of a 25 weight percent solution of peracetic acid in ethyl acetate over a period of about 1.5 hours. After an additional 6 hours at about 30° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 4-oxateracyclo[6.2.1.0$^{2,7}$.0$^{3,5}$]undec-9 - oxy - propanediol (or glycerol mono-4-oxatetracyclo[6.2.1.0$^{2,7}$.0$^{3,5}$]undec - 9-enyl ether) by inspection of its infrared absorption spectrum.

*Example 13*

To a reaction vessel which contains 800 grams of tricyclo[5.2.1.0$^{2,6}$]dec - 3 - en-8-oxy-n-butanol (which results from the boron trifluoride catalyzed addition of 1,4-butanediol to tricyclo[5.2.1.0$^{2,6}$]deca-3,8-diene under the influence of heat), maintained at about 30° C. with stirring, there is added, dropwide, 1550 grams of a 26.2 weight percent solution of peracetic acid in ethyl acetate over a period of 4 hours. After an additional 6 hours at about 45° C., the reaction is essentially complete as indicated by a titration for peracetic acid. The volatile materials, i.e., ethyl acetate, acetic acid by-products, etc., are removed from the reaction product mixture by co-distillation with ethylbenzene. The viscous liquid product, thus obtained, is identified as 4-oxateracyclo[6.2.1.0$^{2,6}$.0$^{3,5}$]-undec-9-oxy-n-butanol by inspection of its infrared absorption spectrum.

*Example 14*

To a reaction vessel which contains 100 grams of ethyl acetate and 125 grams pentaerythritol mono-tricyclo [5.2.1.0$^{2,6}$]-dec-3-en-8-yl ether (which results from the boron trifluoride-catalyzed addition of pentaerythritol to tricyclo[5.2.1.0$^{2,6}$]-deca-3,8-diene under the influence of heat), maintained at about 30° C. with stirring, there is added, dropwise, 168 grams of a 25 weight percent solution of peracetic acid in ethyl acetate over a period of 1.5 hours. After an additional 6 hours at about 30° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as pentaerythritol mono-4-oxatetracyclo [6.2.1.0$^{2,7}$.0$^{3,5}$] undec-9-yl ether by inspection of its infrared absorption spectrum and analysis for the epoxide group.

*Example 15*

To a reaction vessel which contains 76 grams of hexanetriol mono-tetracyclo [6.2.1.1$^{3,6}$.0$^{2,7}$]dodec-9-en-4-yl ether (which results from the boron trifluoride catalyzed addition of 1,2,6-hexanetriol to tetracyclo[6.2.1.1$^{3,6}$.0$^{2,7}$] dodeca-4,9-diene under the influence of heat), maintained at about 30° C. with stirring, there is added, dropwise, 84 grams of a 25 weight percent solution of peracetic acid in ethyl acetate over a period of 1.5 hours. After an additional 6 hours at about 45° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as hexanetriol mono-10-oxapentacyclo[6.3.1.1$^{3,6}$.0$^{2,7}$.0$^{9,11}$]tridec - 4 - yl ether by inspection of its infrared absorption spectrum.

*Example 16*

To a reaction vessel which contains 120 grams of glycerol mono-tetracyclo[6.2.1.1$^{3,6}$.0$^{2,7}$]dodec-9-en-4-yl ether (which results from the boron trifluoride catalyzed addition of glycerol to tetracyclo[6.2.1.1$^{3,6}$.0$^{2,7}$]dodeca-4,9-diene under the influence of heat), maintained at about 30° C. with stirring, there is added, dropwise, 165 grams of a 25.5 weight percent solution of peracetic acid in ethyl acetate over a period of 1.5 hours. After an additional 6 hours at about 30° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained is identified as glycerol mono-10-oxapentacyclo[6.3.1.1$^{3,6}$.0$^{2,7}$.0$^{9,11}$]tridec-4-yl ether by inspection of its infrared absorption spectrum.

*Example 17*

A. To a reaction vessel which contains 66 grams of glycerol mono-tetracyclo[6.2.1.1$^{3,6}$.0$^{2,7}$]dodec - 9-en-4-ylmethyl ether (which results from the Diels-Alder synthesis of 2 mols of cyclopentadiene with one mol of glycerol monoallyl ether), maintained at about 30° C. with stirring, there is added, dropwise, 80 grams of a 24.8 weight percent solution of peracetic acid in ethyl acetate over a period of 2 hours. After an additional 6 hours at about 30° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as glycerol mono-10-oxapentacyclo [6.3.1.1$^{3,6}$.0$^{2,7}$.0$^{9,11}$]tridec-4-ylmethyl ether by inspection of its infrared absorption spectrum.

B. In an analogous manner as above, pentaerythritol mono-tetracyclo[6.2.1.1$^{3,6}$.0$^{2,7}$]dodec-9-en - 4 - ylmethyl ether (prepared from the Diels-Alder synthesis of 2 mols of cyclopentadiene with one mol of pentaerythritol monoallyl ether) is reacted with a solution of peracetic acid in ethyl acetate to give a viscous liquid product which is identified as pentaerythritol mono-10-oxapentacyclo[6.3.1.1$^{3,6}$.0$^{2,7}$.0$^{9,11}$]tridec-4-ylmethyl ether by its infrared absorption spectrum.

*Example 18*

To a reaction vessel which contains 140 grams of tetracyclo[6.2.1.1$^{3,6}$.0$^{2,7}$]dodec-9-en-4-ylethanol (which results from the Diels-Alder synthesis of 2 mols of cyclopentadiene and one mol of 1-buten-4-ol), maintained at about 50° C. with stirring, there is added, dropwise, 260 grams of a 25.5 weight percent solution of peracetic acid in ethyl acetate over a period of 2 hours. After an additional 6 hours at about 45° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 10-oxapentacyclo[6.3.1.1$^{3,6}$.0$^{2,7}$.0$^{9,11}$]tridec-4-ylethanol by inspection of its infrared absorption spectrum.

*Example 19*

The compound, tetracyclo[6.2.1.1$^{3,6}$.0$^{2,7}$]dodec-9-en-4-ol (melting point of 87°–88° C.), is prepared by the saponification of the reaction product obtained by the Diels-Alder synthesis of 2 mols of cyclopentadiene with one mol of vinyl acetate. To 88 grams of tetracyclo[6.2.1.1$^{3,6}$.0$^{2,7}$]dodec-9-en-4-ol, there is added 0.2 gram of potassium hydroxide, followed by heating the resulting admixture to about 100°–120° C. with stirring. Ethylene oxide is fed into the stirred reaction mixture (below the liquid level) until the weight thereof increases by 176 grams. Then the resulting reaction product mixture is cooled, followed by neutralizing the catalyst with acetic acid. The reaction product mixture is washed with aqueous solution of sodium chloride, and then washed with water. The product, a mixture of tetracyclo[6.2.1.1$^{3,6}$.0$^{2,7}$]dodec-9-en-4-oxy(polyethyleneoxy)ethanols, is dried at an elevated temperature under reduced pressure.

*Example 20*

To a reaction vessel which contains 200 grams of ethyl acetate and 200 grams of the mixture of tetracyclo[6.2.1.1$^{3,6}$.0$^{2,7}$]dodec-9-en-4-oxy(polyethyleneoxy)ethanols which is prepared as explained in Example 19 supra and maintained at about 30° C. with stirring, there is added, dropwise, 350 grams of a 26.2 weight percent solution of peracetic acid in ethyl acetate over a period of 2 hours. After an additional 4 hours at about 45° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained is identified as a mixture of 10-oxapentacyclo[6.3.1.1$^{3,6}$.0$^{2,7}$.0$^{9,11}$]tridec-4-oxy(polyethyleneoxy) ethanols.

*Example 21*

To a reaction vessel which contains 160 grams of tricyclo[5.2.1.0$^{3,6}$.0$^{2,7}$.0$^{9,11}$]dec-3-en-8-ol, there is added 0.2 gram of potassium hydroxide, followed by heating the resulting admixture to about 120° C. with stirring. Ethylene oxide is fed into the stirred reaction mixture (below the liquid level) until the weight thereof increases by 240 grams. Then the resulting reaction product mixture is cooled, followed by neutralizing the catalyst with acetic acid. The reaction product mixture is washed with aqueous solution of sodium chloride, and then washed with water. The product, a mixture of tricyclo[5.2.1.0$^{2,6}$]dec-3-en-8-oxy(polyethyleneoxy)ethanols, is dried at an elevated temperature under reduced pressure.

*Example 22*

To a reaction vessel which contains 250 grams of ethyl acetate and 300 grams of the mixture of tricyclo[5.2.1.0$^{2,6}$]dec-3-en-oxy(polyethyleneoxy)ethanols which is prepared as explained in Example 21 supra and maintained at about 40° C. with stirring, there is added, dropwise, 600 grams of a 25.6 weight percent solution of peracetic acid in ethyl acetate over a period of 3 hours. After an additional 4 hours at about 45° C., the reaction is essentially complete as indicated by a titration for peracetic acid. The volatile materials, i.e., ethyl acetate, acetic acid by-product, etc., are removed from the reaction product mixture by co-distillation with ethylbenzene. The very viscous liquid product thus obtained is identified as a mixture of 4-oxatetracyclo[6.2.1.0$^{2,6}$.0$^{3,5}$]undec-9-oxy(polyethyleneoxy)ethanols by inspection of its infrared absorption spectrum.

*Example 23*

To a reaction vessel which contains 80 grams of tricyclo[5.2.1.0$^{2,6}$]dec-3-ene-8,9-diol, there is added 0.3 gram of potassium hydroxide, followed by heating the resulting admixture to about 120° C. with stirring. Ethylene oxide is fed into the stirred reaction mixture (below the liquid level) until the weight thereof increases by 330 grams. Then the resulting reaction product mixture is cooled, followed by neutralizing the catalyst with acetic acid. The reaction product mixture is washed twice with aqueous solution of sodium chloride, and then washed with water. The product, a mixture of tricyclo[5.2.1.0$^{2,6}$]dec-3-en-8,9-ylene-di[oxy(polyethyleneoxy)ethanols], is dried at an elevated temperature under reduced pressure.

*Example 24*

To a reaction vessel which contains 110 grams of ethyl acetate and 110 grams of the mixture of tricyclo[5.2.1.0$^{2,6}$]dec-3-en-8,9-ylene-di[oxy(polyethyleneoxy)ethanols] which is prepared as explained in Example 23 supra and maintained at about 40° C. with stirring, there is added, dropwise, 400 grams of a 26.2 weight percent solution of peracetic acid in ethyl acetate over a period of 2.5 hours. After an additional 6 hours at about 40° C., the reaction is essentially complete as indicated by a titration for peracetic acid. The volatile materials, i.e., ethyl acetate, acetic acid by-product, etc., are removed from the reaction product mixture by co-distillation with ethylbenzene. The very viscous liquid product, thus obtained, is identified as a mixture of 4-oxatetracyclo[6.2.1.0$^{2,6}$.0$^{3,5}$]undec-9,10-ylene-di[oxy(polyethyleneoxy)ethanols] by inspection of its infrared absorption spectrum.

*Example 25*

To a reaction vessel which contains 50 grams of tetracyclo[6.2.1.1$^{3,6}$.0$^{2,7}$]dodec-9-ene-4,5-diol there is added 0.2 gram of potassium hydroxide, followed by heating the resulting admixture to about 100°–120° C. with stirring. Ethylene oxide is fed into the stirred reaction mixture (below the liquid level) until the weight thereof increases by 280 grams. Then the resulting reaction product mixture is cooled, followed by neutralizing the catalyst with acetic acid. The reaction product mixture is washed twice with aqueous solution of sodium chloride, and then washed with water. The product, a mixture of tetracyclo[6.2.1.1$^{3,6}$.0$^{2,7}$]dodec-9-en-4,5-ylene-di[oxy(polyethyleneoxy)ethanols], is dried at an elevated temperature under reduced pressure.

*Example 26*

To a reaction vessel which contains 80 grams of ethyl acetate and 80 grams of the mixture of tetracyclo[6.2.1.1$^{3,6}$.0$^{2,7}$]dodec-9-en-4,5-ylene-di[oxy(polyethyleneoxy)ethanols] which is prepared as explained in Example 25 supra and maintained at about 45° C. with stirring, there is added, dropwise, 300 grams of a 26.7 weight percent solution of peracetic acid in ethyl acetate over a period of 2 hours. After an additional 4 hours at about 45° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as a mixture of 10-oxapentacyclo[6.3.1.1$^{3,6}$.0$^{2,7}$.0$^{9,11}$]tridec-4,5-ylene-di[oxy(polyethyleneoxy)ethanols] by inspection of its infrared absorption spectrum.

Example 27

To 110 grams of the compound, tetracyclo[6.2.1.1$^{3,6}$.0$^{2,7}$]-dodec-9-en-4,5-ylene-dimethanol (prepared via the Diels-Alder synthesis of 2 mols of cyclopentadiene with one mol of 2-butene-1,4-diol) there is added 0.2 gram of potassium hydroxide, followed by heating the resulting admixture to about 100°–120° C. with stirring. Ethylene oxide is fed into the stirred reaction mixture (below the liquid level) until the weight thereof increases by 44 grams. Then the resulting reaction product mixture is cooled, followed by neutralizing the catalyst with acetic acid. The reaction product mixture is washed twice with aqueous solution of sodium chloride, and then washed with water. The product, tetracyclo[6.2.1.1$^{3,6}$.0$^{2,7}$]dodec-9-en-4,5-ylene-di(methyleneoxyethanol), is dried at an elevated temperature under reduced pressure.

Example 28

To a reaction vessel which contains 70 grams of tetracyclo[6.2.1.1$^{3,6}$.0$^{2,7}$]dodec-9-en-4,5-ylene-di(methyleneoxyethanol) maintained at about 30° C. with stirring, there is added, dropwise, 300 grams of a 25.6 weight percent solution of peracetic acid in ethyl acetate over a period of 3 hours. After an additional 4 hours at about 45° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 10-oxapentacyclo[6.3.1.1$^{3,6}$.0$^{2,7}$.0$^{9,11}$]tridec-4,5-ylene-di(methyleneoxyethanol) by inspection of its infrared absorption spectrum.

Example 29

To a reaction vessel which contains 80 grams of tricyclo[5.2.1.0$^{2,6}$]dec-3-en-8,9-ylene-di(oxyethanol) (prepared by heating 0.5 mol of tricyclo[5.2.1.0$^{2,6}$]dec-3-ene-8,9-diol with one mol of ethylene oxide in the presence of potassium hydroxide catalyst) maintained at about 30° C. with stirring, there is added, dropwise, 150 grams of a 25 weight percent solution of peracetic acid in ethyl acetate over a period of 1.5 hours. After an additional 6 hours at about 30° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 4-oxatetracyclo[6.2.1.0$^{2,7}$.0$^{3,5}$]undec-9,10-ylene-di-(oxyethanol) by inspection of its infrared absorption spectrum.

Example 30

(A) To a reaction vessel which contains 60 grams of tricyclo[5.2.1.0$^{2,6}$]dec-3-en-9,10-ylene-di(oxyethanol), which results from the reaction of tricyclo[5.2.1.0$^{2,6}$]dec-3-ene-9,10-diol with two mols of ethylene oxide under the influence of heat and potassium hydroxide, maintained at about 30° C. with stirring, there is added, dropwise, 80 grams of a 24.8 weight percent solution of peracetic acid in ethyl acetate over a period of 2 hours. After an additional 5 hours at about 30° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 4-oxatetracyclo[6.2.1.0$^{2,7}$.0$^{3,5}$]undec-10,11-ylene-di(oxyethanol) by inspection of its infrared absorption spectrum.

Example 31

(A) To a reaction vessel which contains 70 grams of tetracyclo[6.2.1.1$^{3,6}$.0$^{2,7}$]dodec-9-en-4,5-ylene-di(oxyethanol), which results from the potassium hydroxide-catalyzed reaction of two mols of ethylene oxide with tetracyclo[6.2.1.1$^{3,6}$.0$^{2,7}$]dodec-9-ene-4,5-diol under the influence of heat, maintained at about 30° C. with stirring, there is added, dropwise, 80 grams of a 24.8 weight percent solution of peracetic acid in ethyl acetate over a period of 2 hours. After an additional 6 hours at about 30° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 10-oxapentacyclo[6.3.1.1$^{3,6}$.0$^{2,7}$.0$^{9,11}$]tridec-4,5-ylene-di(oxyethanol) by inspection of its infrared absorption spectrum.

Example 32

To a reaction vessel which contains 50 grams of tetracyclo[6.2.1.1$^{3,6}$.0$^{2,7}$]dodec-9-en-4,5-ylene-di(methyleneoxyethanol) maintained at about 30° C. with stirring (prepared by heating 0.5 mol of tetracyclo[6.2.1.1$^{3,6}$.0$^{2,7}$]dodec-9-en-4,5-ylene-dimethanol with one mol of ethylene oxide in the presence of potassium hydroxide catalyst), there is added, dropwise, 140 grams of 25.2 weight percent solution of peracetic acid in ethyl acetate over a period of 2 hours. After an additional 4 hours at about 30° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 10-oxapentacyclo[6.3.1.1$^{3,6}$.0$^{2,7}$.0$^{9,11}$]tridec-4,5-ylene-di(methylene-oxyethanol) by inspection of its infrared absorption spectrum.

Example 33

The equipment employed in this example consisted of a reaction flask fitted with a glass stirring rod and paddle, a Dean-Stark water removal trap and cold water condenser, thermometer, inert gas inlet, and a Variac-controlled electric heating mantle. To the flask was charged 1.0 mol of 4-oxatetracyclo[6.2.1.0$^{2,7}$.0$^{3,5}$]undecan-9-ol which had been neutralized to a pH of approximately 7 with a 2 percent aqueous solution of sodium hydroxide and 1.0 mol of soya fatty acid marketed under the trade name of "Veg Acid 120." The temperature of the reactants was raised slowly to 150° C. and held there for 10 minutes to strip off the water present as a result of the aqueous NaOH addition. Then the temperature was dropped to 100° C. and 0.75 mol of phthalic anhydride and 0.15 mol of maleic anhydride were added to the flask. The temperature of the reactants was raised to 225° C. and held there with agitation while esterification took place. Water of esterification was removed during the reaction using the azeotropic xylene method. The reaction temperature was maintained until an acid number of 14.4 was reached. After cooling, the resin was dissolved in xylene to give a 48.9 percent total solids solution. This resulting resin solution was dark in color and only moderately viscous.

Coatings were prepared from the above described resin solution as follows:

To 100 grams of the 48.9 percent total solids resin solution was added the following drier concentrations based on solid resin: 0.05 percent cobalt as cobalt octoate and 0.10 percent zirconium as a zirconium organic complex. This mixture was applied to cleaned and sanded raw steel panels by dip coating. Cured coatings of approximately one mil thickness were obtained by either baking 30 minutes at 350° F. or by air drying one week at ambient temperature and humidity. Properties obtained on both air dried and baked coatings are summarized below in Table I using the coatings evaluation procedures described earlier.

TABLE I.—PROPERTIES OF AIR DRIED AND BAKED COATINGS PREPARED FROM 4-OXATETRACYCLO[6.2.1.0$^{2,7}$.0$^{3,5}$]UNDECAN-9-ol

| Coatings Properties | Baked | Air Dried |
| --- | --- | --- |
| Sward Hardness | 54 | 34. |
| Impact Resistance, inch-pounds | 320 front and back | >40<45 front. |
| 180° Bend, ⅛" Mandrel | Passed | Passed. |
| Water Resistance | Excellent after 4 hours. | Excellent after 4 hours. |
| Caustic Resistance | Excellent after 24 hours. | Good+ after 4 hours. |
| Acid Resistance | ----do---- | Excellent after 4 hours. |

In order to demonstrate the superior resistance to alkaline conditions of coatings prepared from the compositions of this invention, a comparison was made with coatings prepared from three different commercially available alkyl resins. The properties of the alkyd resin coatings of this example are believed to be typical of those which would be obtained from other conventional alkyd resins. Coatings were prepared in a manner identical to that described above. The physical properties of both the air dried and baked coatings are set forth in Table II below:

218° C. at which time lime as CaO was added at a concentration of 0.5 percent on the monomeric epoxide. The temperature was then increased to 232° C. and maintained for 40 minutes, after which time 1.0 mol of phthalic anhydride and 0.1 mol of maleic anhydride were added. The temperature of approximately 232° C. was maintained until an acid number of 22 was reached. The resin was diluted to 51.2 percent total solids with xylene which gave a dark colored, viscous solution.

To a portion of the above-described solution was added 0.05 percent cobalt metal and 0.1 percent zirconium metal based on the contained resin solids. Coatings of this mixture were applied to a number of steel panels by dip coating. Some were cured by baking 30 minutes at 350° F., and some were cured by air drying for 7 days at ambient conditions. The baked panels had a Sward hardness of TABLE II.—PROPERTIES OF AIR DRIED AND BAKED COATINGS PREPARED FROM COMMERCIALLY AVAILABLE ALKYD RESINS

| | Resin | | |
| --- | --- | --- | --- |
| | A | B | C |
| Baked Coatings: | | | |
| Sward Hardness | 31 | 35 | 8. |
| Impact Resistance, inch lbs | >320 | >320 | >320. |
| 180° Bend, ⅛" Mandrel | Passed | Passed | Passed. |
| Water Resistance | Good− | Good+ | Good−. |
| Caustic Resistance | Poor | Poor | Good−. |
| Acid Resistance | Excellent | Excellent | Excellent |
| Air Dried Coatings: | | | |
| Sward Hardness | 6 | 16 | 4. |
| Impact Resistance, inch lbs | >95<100 | >320 | >320. |
| 180° Bend. ⅛" Mandrel | Passed | Passed | Passed. |
| Water Resistance | Excellent− | Good | Excellent−. |
| Caustic Resistance | Fair | Poor | Fair−. |
| Acid Resistance | Good | Good | Fair. |

A. A medium oil length alkyd based on glycerol, phthalic anhydride and dehydrated castor oil acids. Sold as a 50 percent solution in xylene and having an acid number of 4–10.

B. A medium oil length alkyd resin based on gylcerol, phthalic anhydride and soya fatty acids. This resin has an acid number of 6–12 and is marketed as a 50 percent solution in mineral spirits. It is considered to be a general purpose alkyd.

C. A long oil length alkyd resin based on pentaerythritol, phthalic anhydride and soya fatty acids. This resin has an acid number of 4–8 and is supplied as a 70 percent solution in mineral spirits.

As is evident from a comparison of the results obtained in Tables I and II, coatings prepared from 4-oxatetracyclo-[6.2.1.0$^{2,7}$.0$^{3,5}$]undecan-9-ol exhibit superior resistance to caustic and water than coatings prepared from the commercially available alkyd resins.

*Example 34*

In the same equipment and in a manner similar to that described in Example 33, 0.8 mol of 4-oxatetracyclo-[6.2.1.0$^{2,7}$.0$^{3,5}$]undecan-9-ol and 0.4 mol of linseed oil were added to the flask. The flask was then heated to 66, an impact resistance in excess of 320 inch pounds, and possessed excellent resistance to 2 percent aqueous sodium hydroxide immersion for 4 hours. The air dried coatings exhibited a Sward hardness of 48 and an impact resistance of 95 inch pounds while being rated as fair when exposed to 2 percent aqueous sodium hydroxide for 4 hours.

*Example 35*

In this example the equipment described in Example 33 was utilized. To the flask was charged 1.0 mol of 4-oxatetracyclo[6.2.1.0$^{2,7}$.0$^{3,5}$]undecan - 9-ol, 1.0 mol of lauric acid, and lithium acetate catalyst at a concentration of 0.5 percent on the reactants. A cooking temperature of 140° C. was maintained until an acid number of 16.6 was reached, at which time a second charge of reactants was added comprising 0.38 mol of 9-oxatetracyclo-4.4.1$^{2,5}$.0$^{1,6}$.0$^{8,10}$]undecan-4-ol and 0.85 mol of sebacic acid. The reaction temperature was raised to 200° C. where it was maintained for two hours after which it was increased to 225° C. When an acid number 2.61 was reached, the contents of the flask were diluted to approximately 50 percent total solids with xylene and filtered. The recovered resin solution was 51.05 percent total solids, had a Gardner viscosity of B, and a Gardner color of 6. Theoretically, 70 percent of the available sites were esterified in this resin.

A coating resin formulation was prepared comprising 60 percent by weight of the resin and 40 percent by weight of a thermosetting melamine-formaldehyde resin. This mixture was catalyzed by adding 0.5 percent by weight alkyl phosphoric acid. Coatings were applied to both blass and monderized steel by casting a 3 mil wet film. These were baked 30 minutes in a forced draft oven at 350° F. The resulting coatings were colorless, transparent, with a Sward hardness of 30. They exhibited very good resistance to xylene by surviving a scrub test in which a xylene-soaked square of cheesecloth is rubbed back and forth across the coating for twenty cycles with pressure applied to create an intimate contact between the cloth and the coating.

*Example 36*

The equipment described in Example 33 was charged with 1.0 mol of 4-oxatetracyclo[6.2.1.0$^{2,7}$.0$^{3,5}$]undecan-9-ol, 1.0 mol of soya fatty acids, 0.75 mol of tetrahydrophthalic anhydride, 0.075 mol of maleic anhydride and 0.5 weight percent lithium acetate based on the weight of the first two ingredients. A reaction temperature of 225° C. was maintained during the esterification and the water formed was removed by the azeotropic xylene technique. After approximately 6.5 hours under these conditions, the acid number of the reaction mixture was 8.9. At this point the run was terminated and xylene was added to dissolve the final resin. The resulting solution was 61.6 percent solids, had a Gardner color of 4 and a Gardner viscosity of G.

To 200 grams of the above-described solution was added cobalt drier to give a cobalt metal concentration of 0.05 percent on contained resin and zirconium drier to give a zirconium metal concentration of 0.1 percent on the contained resin. A number of metal panels were spray coated with the above formulation to give dry coating thicknesses of 1.3–1.4 mils. Half this number of panels were cured by baking 30 minutes at 350° F., and half were cured by aging for several days at a temperature of approximately 23° C. and at a relative humidity of approximately 50 percent.

The physical properties of these coatings are set forth in Table III below:

acid number of about 14 was reached. The resin was then diluted to 70 percent total solids with mineral spirits and had a Gardner color of 8 and a Gardner viscosity of R.

To 100 grams of the above-described solution was added 0.589 gram of cobalt drier and 1.178 grams of zirco drier. Coatings of this mixture were applied to a number of steel panels by dip coating. Some were cured by baking 30 minutes at 350° F., and some were cured by air drying for 7 days at ambient conditions. The baked panels had a Sward hardness of 38, an impact resistance in excess of 160 inch pounds face and reverse, and possessed excellent resistance respectively to aqueous sodium hydroxide and 1 percent sulfuric acid immersion for 24 hours.

*Example 38*

In the same equipment and in a manner similar to that described in Example 33, 76.1 parts by weight of 4-oxatetracyclo[6.2.1.0$^{2,7}$.0$^{3,5}$]undecan - 9 - oxyethanol and 88 parts of soya fatty acid are added to the flask. The flask is then heated to 218° C. at which time lime as CaO is added at a concentration of 0.5 percent on the monomeric epoxide. The temperature is then increased to 232° C. and maintained for 40 minutes, after which time 47.1 parts of phthalic anhydride is added. The temperature of approximately 232° C. is maintained until an acid number of 22 is reached. The resin is diluted to 51.2 percent total solids with xylene which gives a dark colored, viscous solution.

To a portion of the above-described solution is added 0.05 percent cobalt metal and 0.1 percent zirconium metal based on the contained resin solids. Coatings of this mixture are applied to a number of steel panels by dip coating, and are cured by air drying for 7 days at ambient conditions. The air dried coatings exhibit a Sward hardness in excess of 40 and good resistance when exposed to 2 percent aqueous sodium hydroxide for 4 hours.

In a similar manner, the monoepoxy alcohol compounds hereinbefore designated as (c)–(v) are reacted with fatty acids or oils and a polyfunctional acid or anhydride to give resinous compounds which are curable to coatings having outstanding chemical and physical properties.

*Example 39*

In order to demonstrate the importance of oxygen content on the chemical and physical properties of resins prepared in accordance with the teachings of this invention, a comparison was made with the coating properties of TABLE III.—PROPERTIES OF AIR DRIED AND BAKED COATINGS PREPARED FROM 4-OXATETRACYCLO [6.2.1.0$^{2,7}$.0$^{3,5}$] UNDECAN-9-OP-

| Coating Properties | Baked | Air Dried |
|---|---|---|
| Sward Hardness | 42 | 40. |
| Face Impact Resistance | 275 inch lbs | 35 inch lbs. |
| Reverse Impact Resistance | 150 inch lbs | |
| 180° Bend, ⅛″ Conical Mandrel | Passed | Failed. |
| Caustic Resistance | Good+ | Good+. |
| Water Resistance | Excellent | Excellent—. |
| Acid Resistance | ....do | Do. |

*Example 37*

In the same equipment and in a manner similar to that described in Example 33, 216 grams (0.75 mol) of tall oil fatty acid, 44.4 grams (0.3 mol) of phthalic anhydride, 4.9 grams (0.05 mol) of maleic anhydride and 0.5 weight percent lithium acetate catalyst were added to the flask. The contents of the flask were heated to 170° C. and 83 grams (0.5 mol) of 4-oxatetracyclo[6.2.1.0$^{2,7}$.0$^{3,5}$]undecan-9-ol added dropwise over a period of 25 minutes. The temperature was then increased to 200° C. and maintained until an conventional alkyd resins. The same commercially available resins which were employed in Example 33 (Table II) were used in this example, and are identified as A, B and C. Resin D was prepared in accordance with the teachings of this invention and is a medium oil length 4-oxatetracyclo[6.2.1.0$^{2,7}$.0$^{3,5}$]undecan-9-ol tetrahydrophthalic anhydride, soya modified resin.

It is evident from the data set forth in Table IV below that resins having an oxygen content within the range of 16–18 percent are characterized by markedly improved properties.

TABLE IV.—COMPARISON OF THE OXYGEN CONTENT OF RESINS WITH COATING PROPERTIES OF CONVENTIONAL ALKYD RESINS

| Property | Alkyd Resin A | Alkyd Resin B | Alkyd Resin C | Resin D |
|---|---|---|---|---|
| Oxygen Content in Percent | 23.7 | 21.8 | 18.6 | 16.2. |
| Baked Coatings (30 minutes at 350° F.): | | | | |
| Sward Hardness | 31 | 35 | 8 | 42. |
| Boiling Water Immersion, 1 hour | Good— | Good+ | Good— | Excellent. |
| 20 percent NaOH Exposure, 24 hours at Room Temp. | Poor | Poor | Good— | Good+. |
| Air Dried Coatings (7 days, Ambient Conditions): | | | | |
| Sward Hardness | 6 | 16 | 4 | 40. |
| Water Immersion, 4 hours at Room Temp | Excellent— | Good | Excellent— | Excellent—. |
| 2 percent NaOH Exposure, 4 hours at Room Temp | Fair | Poor | Fair— | Good+. |

NOTE.—All coatings formulated with 0.05 percent Cobalt Drier Metal and 0.1 percent Zirconium Drier Metal based on contained resin. Coatings were applied by spraying on bonderized steel panels and given the indicated cure cycle.

Although the invention has been illustrated by the preceding examples, it is not to be construed as limited to the materials employed herein, but rather, the invention encompasses the generic area as hereinbefore disclosed. Various modifications and improvements can be made without departing from the spirit and scope thereof.

What is claimed is:

1. A composition comprising a mixture of:
(I) at least one monoepoxy alcohol compound selected from the group consisting of
   (a) 4-oxatetracyclo[6.2.1.0$^{2,7}$.0$^{3,5}$]undecan-9-ol,
   (b) 4 - oxatetracyclo[6.2.1.0$^{2,7}$.0$^{3,5}$]undec - 9-oxyalkanol,
   (c) 4 - oxatetracyclo[6.2.1.0$^{2,7}$.0$^{3,5}$]undec - 9-oxyalkanepoly-ol,
   (d) 4 - oxatetracyclo[6.2.1.0$^{2,7}$.0$^{3,5}$]undecane - 9,-10-diol,
   (e) 4 - oxatetracyclo[6.2.1.0$^{2,7}$.0$^{3,5}$]undecane - 10,-11-diol,
   (f) 10 - oxapentacyclo[6.3.1.1$^{3,6}$.0$^{9,11}$]tridecan - 4-ol,
   (g) 10 - oxapentacyclo[6.3.1.1$^{3,6}$.0$^{2,7}$.0$^{9,11}$]tridecane-4,5-diol,
   (h) 10 - oxapentacyclo[6.3.1.1$^{3,6}$.0$^{2,7}$.0$^{9,11}$]tridec-4-ylalkanol,
   (i) 10 - oxapentacyclo[6.3.1.1$^{3,6}$.0$^{2,7}$.0$^{9,11}$]tridec-4,5-ylene-dialkanol,
   (j) 10 - oxapentacyclo[6.3.1.1$^{3,6}$.0$^{2,7}$.0$^{9,11}$]tridec-4-oxyalkanol,
   (k) 10 - oxapentacyclo[6.3.1.1$^{3,6}$.0$^{2,7}$.0$^{9,11}$]tridec-4-oxyalkane-poly-ol,
   (l) 10 - oxapentacyclo[6.3.1.1$^{3,6}$.0$^{2,7}$.0$^{9,11}$]tridec-4-ylmethyleneoxyalkanol,
   (m) 10 - oxapentacyclo[6.3.1.1$^{3,6}$.0$^{2,7}$.0$^{9,11}$]tridec-4-ylmethyleneoxyalkane-poly-ol,
   (n) the 4 - oxatetracyclo[6.2.1.0$^{2,7}$.0$^{3,5}$]undec - 9-oxy(mono- and polyalkyleneoxy)alkanols,
   (o) the 4-oxatetracyclo[6.2.1.0$^{2,7}$.0$^{3,5}$]undec-9,10-ylene - di[oxy(mono- and polyalkyleneoxy)alkanols],
   (p) the 4-oxatetracyclo[6.2.1.0$^{2,7}$.0$^{3,5}$]undec - 10,11-ylene-di[oxy(mono- and polyalkyleneoxy)alkanols],
   (q) the 10 - oxapentacyclo[6.3.1.1$^{3,6}$.0$^{2,7}$.0$^{9,11}$]tridec-4-oxy(mono- and polyalkyleneoxy)alkanols,
   (r) the 10 - oxapentacyclo[6.3.1.1$^{3,6}$.0$^{2,7}$.0$^{9,11}$]tridec-4,5-xylene-di[oxy(mono- and polyalkyleneoxy)alkanols],
   (s) 10 - oxapentacyclo[6.3.1.1$^{3,6}$.0$^{2,7}$.0$^{9,11}$]tridec-4-yl-alkyleneoxyalkanol,
   (t) the 10 - oxapentacyclo[6.3.1.1$^{3,6}$.0$^{2,7}$.0$^{9,11}$]tridec-4-ylalkyleneoxy(mono- and polyalkeneoxy)-alkanols,
   (u) 10 - oxapentacyclo[6.3.1.1$^{3,6}$.0$^{2,7}$.0$^{9,11}$]tridec-4,5-ylene-di(alkyleneoxyalkanol), and
   (v) the 10 - oxapentacyclo[6.3.1.1$^{3,6}$.0$^{2,7}$.0$^{9,11}$]tridec-4,5-ylene-di[alkyleneoxy(mono- and polyalkyleneoxy)alkanols];
(II) at least one fatty acid compound selected from the group consisting of saturated and unsaturated fatty acids and fatty acid oils, said fatty acid compound present in an amount sufficient to provide about 0.1 to about 1.0 carboxy group per hydroxy group of said monoepoxy alcohol; and
(III) at least one polyfunctional compound selected from the group consisting of polycarboxylic acids and polycarboxylic acid anhydrides, said polyfunctional compound present in an amount sufficient to provide about 0.2 to about 3.0 carboxy groups per epoxy group of said monoepoxy alcohol compound.

2. The composition of claim 1 contained in an inert, normally liquid organic vehicle.

3. The composition of claim 1 wherein said monoepoxy alcohol compound is 4-oxatetracyclo[6.2.1.0$^{2,7}$.0$^{3,5}$]undecan-9-ol, wherein said fatty acid compound is a fatty acid, and wherein said polyfunctional compound is a polycarboxylic acid, said fatty acid and said polycarboxylic acid being present in an amount sufficient to provide from about 0.1 to about 1.0 carboxyl group of said fatty acid per hydroxyl group of said monoepoxy alcohol, and from about 0.2 to about 3.0 carboxy groups of said polycarboxylic acid per epoxy group of said monoepoxy alcohol.

4. The composition of claim 1 wherein said monoepoxy alcohol compound is 4-oxatetracyclo[6.2.1.0$^{2,7}$.0$^{3,5}$]undecan-9-ol, wherein said fatty acid compound is a fatty acid, and wherein said polyfunctional compound is a polycarboxylic acid anhydride, said fatty acid and said polycarboxylic acid anhydride being present in an amount sufficient to provide from about 0.1 to about 1.0 carboxy group of said fatty acid per hydroxyl group of said monoepoxy alcohol, and from about 0.2 to about 3.0 carboxy groups of said polycarboxylic acid anhydride per epoxy group of said monoepoxy alcohol.

5. The composition of claim 1 wherein said monoepoxy alcohol compound is 4-oxatetracyclo[6.2.1.0$^{2,7}$.0$^{3,5}$]undecan-9-ol, wherein said fatty acid compound is a fatty acid oil, and wherein said polyfunctional compound is a polycarboxylic acid, said fatty acid oil and said polycarboxylic acid being present in an amount sufficient to provide from about 0.1 to about 1.0 carboxy group of said fatty acid oil per hydroxyl group of said monoepoxy alcohol, and from about 0.2 to about 3.0 carboxyl groups of said polycarboxylic acid.

6. The composition of claim 1 wherein said monoepoxy alcohol compound is 4-oxatetracyclo[6.2.1.0$^{2,7}$.0$^{3,5}$]undecan-9-ol, wherein said fatty acid compound is a fatty acid oil, and wherein said polyfunctional compound is a polycarboxylic acid anhydride, said fatty acid oil and said polycarboxylic acid anhydride being present in an amount sufficient to provide from about 0.1 to about 1.0 carboxy group of said fatty acid oil per hydroxyl group of said monoepoxy alcohol, and from about 0.2 to about 3.0 carboxy groups of said polycarboxylic acid anhydride per epoxy group of said monoepoxy alcohol.

7. A composition comprising the reaction product obtained by heating at elevated temperatures a mixture of:
(I) at least one monoepoxy alcohol compound selected from the group consisting of
   (a) 4-oxatetracyclo[6.2.1.0$^{2,7}$.0$^{3,5}$]undecan-9-ol, (b) 4-oxatetracyclo[6.2.1.0$^{2,7}$.0$^{3,5}$]undec-9-oxyalkanol,
(c) 4-oxatetracyclo[6.2.1.0$^{2,7}$.0$^{3,5}$]undec-9-oxyalkane-poly-ol,
(d) 4-oxatetracyclo[6.2.1.0$^{2,7}$.0$^{3,5}$]undecane-9,10-diol,
(e) 4-oxatetracyclo[6.2.1.0$^{2,7}$.0$^{3,5}$]undecane-10,11-diol,
(f) 10-oxapentacyclo[6.3.1.1$^{3,6}$.0$^{9,11}$]tridecan-4-ol,
(g) 10-oxapentacyclo[6.3.1.1$^{3,6}$.0$^{2,7}$.0$^{9,11}$]tridecane-4,5-diol,
(h) 10-oxapentacyclo[6.3.1.1$^{3,6}$.0$^{2,7}$.0$^{9,11}$]tridec-4-ylalkanol,
(i) 10-oxapentacyclo[6.3.1.1$^{3,6}$.0$^{2,7}$.0$^{9,11}$]tridec-4,5-ylene-dialkanol,
(j) 10-oxapentacyclo[6.3.1.1$^{3,6}$.0$^{2,7}$.0$^{9,11}$]tridec-4-oxyalkanol,
(k) 10-oxapentacyclo[6.3.1.1$^{3,6}$.0$^{2,7}$.0$^{9,11}$]tridec-4-oxyalkane-poly-ol,
(l) 10-oxapentacyclo[6.3.1.1$^{3,6}$.0$^{2,7}$.0$^{9,11}$]tridec-4-ylmethyleneoxyalkanol,
(m) 10-oxapentacyclo[6.3.1.1$^{3,6}$.0$^{2,7}$.0$^{9,11}$]tridec-4-ylmethyleneoxyalkane-poly-ol,
(n) the 4-oxatetracyclo[6.2.1.0$^{2,7}$.0$^{3,5}$]undec-9-oxy(mono- and polyalkyleneoxy)alkanols,
(o) the 4-oxatetracyclo[6.2.1.0$^{2,7}$.0$^{3,5}$]undec-9,10-ylene-di[oxy(mono- and polyalkyleneoxy)alkanols],
(p) the 4-oxatetracyclo[6.2.1.0$^{2,7}$.0$^{3,5}$]undec-10,11-ylene-di[oxy(mono- and polyalkyleneoxy)alkanols],
(q) the 10-oxapentacyclo[6.3.1.1$^{3,6}$.0$^{2,7}$.0$^{9,11}$]tridec-4-oxy(mono- and polyalkyleneoxy)alkanols,
(r) the 10-oxapentacyclo[6.3.1.1$^{3,6}$.0$^{2,7}$.0$^{9,11}$]tridec-4,5-ylene-di[oxy(mono- and polyalkyleneoxy)alkanols],
(s) 10-oxapentacyclo[6.3.1.1$^{3,6}$.0$^{2,7}$.0$^{9,11}$]tridec-4-yl-alkyleneoxyalkanol,
(t) the 10-oxapentacyclo[6.3.1.1$^{3,6}$.0$^{2,7}$.0$^{9,11}$]tridec-4-ylalkyleneoxy(mono- and polyalkyleneoxy)alkanols,
(u) 10-oxapentacyclo[6.3.1.1$^{3,6}$.0$^{2,7}$.0$^{9,11}$]tridec-4,5-ylene-di(alkyleneoxyalkanol), and
(v) the 10-oxapentacyclo[6.3.1.1$^{3,6}$.0$^{2,7}$.0$^{9,11}$]tridec-4,5-ylene-di[alkyleneoxy(mono- and polyalkyleneoxy)alkanols];

(II) at least one fatty acid compound selected from the group consisting of saturated and unsaturated fatty acids and fatty acid oils, said fatty acid compound present in an amount sufficient to provide about 0.1 to about 1.0 carboxy group per hydroxy group of said monoepoxy alcohol; and (III) at least one polyfunctional compound selected from the group consisting of polycarboxylic acids and polycarboxylic acid anhydrides, said polyfunctional compound present in an amount sufficient to provide about 0.2 to about 3.0 carboxy groups per epoxy group of said monoepoxy alcohol compound, said reaction product having a total oxygen content of from about 12 to about 20 weight percent.

8. The composition of claim 7 contained in an inert, normally liquid organic vehicle.

9. The composition of claim 7 wherein said monoepoxy alcohol compound is 4-oxatetracyclo[6.2.1.0$^{2,7}$.0$^{3,5}$]undecan-9-ol, wherein said fatty acid compound is a fatty acid, and wherein said polyfunctional compound is a polycarboxylic acid, said fatty acid and said polycarboxylic acid being present in an amount sufficient to provide from about 0.1 to about 1.0 carboxy group of said fatty acid per hydroxyl group of said monoepoxy alcohol, and from about 0.2 to about 3.0 carboxy groups of said polycarboxylic acid per epoxy group of said monoepoxy alcohol, said reaction product having a total oxygen content of from about 12 to about 20 weight percent.

10. The composition of claim 7 wherein said monoepoxy alcohol compound is 4-oxatetracyclo[6.2.1.0$^{2,7}$.0$^{3,5}$]undecan-9-ol, wherein said fatty acid compound is a fatty acid, and wherein said polyfunctional compound is a polycarboxylic acid anhydride, said fatty acid and said polycarboxylic acid anhydride being present in an amount sufficient to provide from about 0.1 to about 1.0 carboxy group of said fatty acid per hydroxyl group of said monoepoxy alcohol, and from about 0.2 to about 3.0 carboxy groups of said polycarboxylic acid anhydride per epoxy group of said monoepoxy alcohol, said reaction product having a total oxygen content of from about 12 to about 20 weight percent.

11. The composition of claim 7 wherein said monoepoxy alcohol compound is 4-oxatetracyclo[6.2.1.0$^{2,7}$.0$^{3,5}$]undecan-9-ol, wherein said fatty acid compound is a fatty acid oil, and wherein said polyfunctional compound is a polycarboxylic acid, said fatty acid oil and said polycarboxylic acid being present in an amount sufficient to provide from about 0.1 to about 1.0 carboxy group of said fatty acid oil per hydroxyl group of said monoepoxy alcohol, and from about 0.2 to about 3.0 carboxy groups of said polycarboxylic acid per epoxy of said monoepoxy alcohol, said reaction product having a total oxygen content of from about 12 to about 20 weight percent.

12. The composition of claim 7 wherein said monoepoxy alcohol comopund is 4-oxatetracyclo[6.2.1.0$^{2,7}$.0$^{3,5}$]undecan-9-ol, wherein said fatty acid compound is a fatty acid oil, and wherein said polyfunctional compound is a polycarboxylic acid anhydride, said fatty acid oil and said polycarboxylic acid anhydride being present in an amount sufficient to provide from about 0.1 to about 1.0 carboxy group of said fatty acid oil per hydroxyl group of said monoepoxy alcohol, and from about 0.2 to about 3.0 carboxy groups of said polycarboxylic acid anhydride per epoxy group of said monoepoxy alcohol, said reaction product having a total oxygen content of from about 12 to about 20 weight percent.

13. The composition of claim 7 wherein said monoepoxy alcohol compound is 4-oxatetracyclo[6.2.1.0$^{2,7}$.0$^{3,5}$]undecan-9-ol, wherein said fatty acid compound is soya fatty acid, and wherein said polyfunctional compound is a mixture of tetrahydrophthalic anhydride and maleic anhydride, said soya fatty acid, tetrahydrophthalic anhydride and maleic anhydride present in an amount sufficient to provide from about 0.1 to about 1.0 carboxy group of said soya fatty acid per hydroxyl group of said monoepoxy alcohol, and from about 0.2 to about 3.0 carboxy groups of said mixture of tetrahydrophthalic anhydride and maleic anhydride per epoxy group of said monoepoxy alcohol, said reaction product having a total oxygen content of from about 12 to about 20 weight percent.

14. The composition of claim 7 wherein said monoepoxy alcohol compound is 4-oxatetracyclo[6.2.1.0$^{2,7}$.0$^{3,5}$]undecan-9-ol, wherein said fatty acid compound is soya fatty acid, and wherein said polyfunctional compound is a mixture of phathalic anhydride and maleic anhydride, said soya fatty acid, phthalic anhydride and maleic anhydride present in an amount sufficient to provide from about 0.1 to about 1.0 carboxy group of said soya fatty acid per hydroxyl group of said monoepoxy alcohol, and from about 0.2 to about 3.0 carboxy groups of said mixture of phthalic anhydride and maleic anhydride per epoxy group of said monoepoxy alcohol, said reaction product having a total oxygen content of from about 12 to about 20 weight percent.

15. The composition of claim 7 wherein said monoepoxy alcohol compound is 4-oxatetracyclo[6.2.1.0$^{2,7}$.0$^{3,5}$]undecan-9-ol, wherein said fatty acid compound is linseed oil, and wherein said polyfunctional compound is a mixture of phthalic anhydride and maleic anhydride, said linseed oil, phthalic anhydride and maleic anhydride present in an amount sufficient to provide from about 0.1 to about 1.0 carboxy group of said linseed oil per hydroxyl group of said monoepoxy alcohol, and from about 0.2 to about 3.0 carboxy groups of said mixture of phthalic anhydride and maleic anhydride per epoxy group of said monoepoxy alcohol, said reaction product having a total oxygen content of from about 12 to about 20 weight percent.

16. The composition of claim 7 wherein said monoepoxy alcohol compound is 4-oxatetracyclo[6.2.1.0$^{2,7}$.0$^{3,5}$]undecan-9-ol, wherein said fatty acid compound is tall oil fatty acid, and wherein said polyfunctional compound is a mixture of phthalic anhydride and maleic anhydride, said tall oil fatty acid, phthalic anhydride and maleic anhydride present in an amount sufficient to provide from about 0.1 to about 1.0 carboxy group of said tall oil fatty acid per hydroxyl group of said monoepoxy alcohol, and from about 0.2 to about 3.0 carboxy groups of said mixture of phthalic anhydride and maleic anhydride per epoxy group of said monoepoxy alcohol, said reaction product having a total oxygen content of from about 12 to about 20 weight percent.

17. A curable coating composition comprising the composition of claim 9 and a drier.

18. The cured composition of claim 17.

19. A curable coating composition comprising the composition of claim 10 and a drier.

20. The cured composition of claim 19.

21. A curable coating composition comprising the composition of claim 11 and a drier.

22. The cured composition of claim 21.

23. A curable coating composition comprising the composition of claim 12 and a drier.

24. The cured composition of claim 23.

References Cited

UNITED STATES PATENTS

| | | | |
|---|---|---|---|
| 2,653,141 | 9/1953 | Greenlee | 260—18 |
| 2,967,840 | 1/1961 | Phillips et al. | 260—22 |
| 3,012,979 | 12/1961 | Stephens et al. | 260—18 |
| 3,027,340 | 3/1962 | Masters | 260—22 |
| 3,042,686 | 7/1962 | O'Brien et al. | 260—78.4 |
| 3,079,354 | 2/1963 | Goldblatt et al. | 260—348 |
| 3,215,757 | 11/1965 | Scheibli et al. | 260—18 |

FOREIGN PATENTS 1,305,630  8/1962  France.

DONALD E. CZAJA, *Primary Examiner.*

LEON J. BERCOVITZ, *Examiner.*

R. W. GRIFFIN, *Assistant Examiner.*